United States Patent
Fitchett et al.

(10) Patent No.: US 8,521,186 B2
(45) Date of Patent: Aug. 27, 2013

(54) METHOD AND DEVICE FOR DETERMINING LOCATION-ENHANCED PRESENCE INFORMATION FOR ENTITIES SUBSCRIBED TO A COMMUNICATIONS SYSTEM

(75) Inventors: Jeff Fitchett, Kanata (CA); Andrew Paryzek, Kanata (CA); Kent Felske, Kanata (CA); Guy Duxbury, Nepean (CA); Alan Graves, Kanata (CA)

(73) Assignee: Rockstar Consortium US LP, Plano, TX (US)

( * ) Notice: Subject to any disclaimer, the term of this patent is extended or adjusted under 35 U.S.C. 154(b) by 1172 days.

(21) Appl. No.: 11/502,509

(22) Filed: Aug. 11, 2006

(65) Prior Publication Data

US 2007/0167170 A1     Jul. 19, 2007

Related U.S. Application Data

(60) Provisional application No. 60/759,560, filed on Jan. 18, 2006.

(51) Int. Cl.
*H04W 24/00* (2009.01)

(52) U.S. Cl.
USPC .......... 455/456.3; 455/456.1; 455/456.2; 455/456.6; 455/552.1; 455/404.2

(58) Field of Classification Search
USPC ............ 455/456.1–456.6, 414, 412, 413, 455/404.1, 414.1, 414.3, 412.1, 412.2, 552.1, 455/556.2, 55.1; 379/201.01, 207.12, 201.07, 379/201.11, 201.06; 370/312, 328, 329, 370/335, 342, 235
See application file for complete search history.

(56) References Cited

U.S. PATENT DOCUMENTS

| | | | |
|---|---|---|---|
| 6,006,098 A | 12/1999 | Rathnasabapathy et al. | |
| 6,097,960 A | 8/2000 | Rathnasabapathy et al. | |
| 6,320,534 B1 | 11/2001 | Goss | |
| 6,943,825 B2 | 9/2005 | Silvester | |
| 6,944,451 B2 | 9/2005 | Mukherjee et al. | |
| 2004/0064568 A1 | 4/2004 | Arora et al. | |
| 2005/0070310 A1* | 3/2005 | Caspi et al. | 455/456.5 |
| 2005/0250516 A1* | 11/2005 | Shim | 455/456.1 |
| 2006/0072726 A1 | 4/2006 | Klein et al. | |
| 2006/0093118 A1 | 5/2006 | Agrawal et al. | |
| 2006/0121904 A1 | 6/2006 | Reuhkala et al. | |
| 2006/0181243 A1 | 8/2006 | Graves et al. | |
| 2006/0181424 A1 | 8/2006 | Graves et al. | |
| 2006/0183426 A1 | 8/2006 | Graves et al. | |

(Continued)

OTHER PUBLICATIONS

Non-Final Rejection mailed Oct. 29, 2010, for U.S. Appl. No. 11/502,570.
Final Rejection mailed May 11, 2011, for U.S. Appl. No. 11/502,570.
Non-Final Rejection mailed Oct. 27, 2010, for U.S. Appl. No. 11/502,571.

(Continued)

*Primary Examiner* — Vladimir Magloire
*Assistant Examiner* — Babar Sarwar
(74) *Attorney, Agent, or Firm* — Withrow & Terranova, PLLC

(57) ABSTRACT

System and method for determining location-enhanced presence information for a particular entity subscribed to a communications system. Location information indicative of a current location for the particular entity is obtained, as well as presence information indicative of a current activity status of the particular entity within the communications system. A combination of the current location and current activity status of the particular entity is applied as a condition to a set of conditional rules associated with the particular entity, for determining current location-enhanced presence information for the particular entity.

22 Claims, 21 Drawing Sheets

(56) References Cited

U.S. PATENT DOCUMENTS

2006/0184376 A1   8/2006   Graves et al.
2006/0185005 A1   8/2006   Graves et al.
2006/0236373 A1   10/2006   Graves et al.
2006/0240771 A1   10/2006   Graves et al.
2007/0060137 A1*   3/2007   Yeatts et al. .................. 455/445
2007/0060174 A1*   3/2007   Newton et al. ............. 455/456.5
2007/0147595 A1   6/2007   Daniell

OTHER PUBLICATIONS

Final Rejection mailed May 13, 2011, for U.S. Appl. No. 11/502,571.
Non-Final Rejection mailed May 3, 2012, for U.S. Appl. No. 11/502,570, 39 pages.
Final Office Action for U.S. Appl. No. 11/502,570 mailed Dec. 4, 2012, 44 pages.

* cited by examiner

|  | Entity ID | 001 | 002 | 003 | 004 | 005 | 006 |
|---|---|---|---|---|---|---|---|
| Entity ID | Locatable Entity | John Smith | John's Badge | Cell | Tablet | Equip. X | Equip. Tag |
| 001 | John Smith | D/W | I/S | I/S | I/M | N | N |
| 002 | John's Badge | I/S | D/S | I/M | I/W | N | N |
| 003 | Cell | I/S | I/M | D/S | I/W | N | N |
| 004 | Tablet | I/M | I/W | I/W | D/S | N | N |
| 005 | Equipment X | N | N | N | N | N | I/S |
| 006 | Equipment Tag | N | N | N | N | I/S | D/S |

"D" =Direct    "W" =Weak
"I" =Indirect   "M" =Moderate
"N" =Null       "S" =Strong

FIG. 3

Sample of Friends/Contacts Screen

| Contacts | | | |
|---|---|---|---|
| User | Presence Status | Location | Location-Enhanced Presence |
| John Smith | Active | Meeting Room A | In a meeting |
| Jane Doe | Offline | Out-of-building | Unavailable |
| Jill | Connected | Hall D. | Exiting building |
| Jack | Offline | Client Room | Do not disturb |
| Joe | Active | Zone 3 | Security Alert |
| Fred | Active on PDA | Hall E. | Mobile in building |

FIG. 21

METHOD AND DEVICE FOR DETERMINING LOCATION-ENHANCED PRESENCE INFORMATION FOR ENTITIES SUBSCRIBED TO A COMMUNICATIONS SYSTEM

CROSS-REFERENCE TO RELATED APPLICATION

The present application claims the benefit under 35 U.S.C. 119(e) of a U.S. Provisional Patent Application to Fitchett et al. entitled "METHOD AND APPARATUS FOR DYNAMIC SESSION RE-DIRECT AND OTHER FUNCTIONS BASED ON LOCATION-ENHANCED PROCESSING IN A MULTIMEDIA COMMUNICATIONS SYSTEM", Ser. No. 60/759,560, filed on Jan. 18, 2006, hereby incorporated by reference herein.

FIELD OF THE INVENTION

The present invention relates to the field of communications routing. More specifically, it pertains to a system and method for dynamically redirecting communications sessions based on location-enhanced information, for example in a multimedia environment.

BACKGROUND

In an increasingly mobile society, people use many different devices on a daily basis in order to stay connected: PC/laptop, cell phone, office phone, home phone, PDA, tablet, internet connection, etc. It is the emergence of multimedia communications, enabled by for example SIP (Session Initiation Protocol), that now allows for multiple devices or applications, as well as many different forms of communication (i.e. voice, video, chat, data, etc.) to be associated with one person or object.

In a multimedia environment, the ability to route and re-direct communications sessions effectively and efficiently is an important challenge, especially from the perspective of business productivity. Within an enterprise, much effort is expended and effectively wasted in trying to track down people for urgent meetings or calls. This effort and the associated wasted time takes on an even greater importance in certain settings, such as a hospital. The efficiency with which communications occur in a healthcare environment often directly affects the quality of the healthcare services provided to patients and, in some cases, has a critical impact on the condition of patients. For instance, in situations where a few minutes can represent the difference between life and death for a patient, the efficiency of communications may be a determining factor in saving the patient's life.

When it comes to routing and re-directing sessions within existing communications systems, different systems rely on different routing factors and allow for different degrees of routing and handling of the sessions. In the case of telephony networks, phone calls are commonly handled and re-routed on the basis of the location of a communications terminal and the state of the terminal. For example, the approximate location of a cellular phone can be used to route an emergency call to the correct emergency agency. Within these networks, the routing for both the lower (network-oriented) layer communications and the higher (application-oriented) layer communications is usually changed dynamically and transparently to the source and destination.

In other existing communications systems, routing/re-directing of sessions may be conducted on the basis of policy input or user configuration. For example, one such communications system allows users to indicate their current mode of communications, such as "office phone" or "cell phone", and adjusts routing parameters accordingly. In another system, the user is allowed to input a current state, such as "in the office" or "mobile", and the system will make the assumption that the user's preferred mode of communications is the office phone when in the office and the cell phone when mobile. Typically, adjusting the routing parameters involves updating one or more entries in a routing table, in order to specify the preferred route and source/destination device. In a typical example of implementation of this communication system, a static pre-configured set of routes is coupled with a manual or semi-manual triggering mechanism to change the routes (such as pushing a touch tone keypad on a telephone).

"Presence" is also used to reconfigure routing parameters and tables in other existing communications systems. Presence, a concept that has emerged as the sophistication of computer and multimedia communications has increased, is a status of the nature of activity of the user (object or person), usually in the context of computer or communications activity. A well-known example of presence is the indication provided by an on-line chat network to advise other users of a person's status, which may be "online", "online and active", "online and busy", "offline", "web camera active", "web camera inactive", etc. Other users view the presence indication and decide on the basis of this indication whether or not to try contacting the person, whether to change the nature of their message, whether to change the configuration of their multimedia communications session, etc. Users also have control over what other users can see in terms of their status and may customize this status to a certain degree. Administrators of the on-line chat network can select the set of automated presence indicators to be displayed and have control over network functions related to presence.

Unfortunately, the above-described known methods for routing and re-directing communications sessions lack the necessary intelligence and sophistication to meet the current and future demand for optimized communications and improved business processes within multimedia communications systems. Admittedly, each of these methods in and of themselves may be useful and applicable to a certain degree for routing and re-directing communications sessions within a multimedia environment. However, the complexity associated with handling communications sessions in or with a multimedia communications system, as well as the potential for intelligently automating routing and re-directs within the multimedia communications system based on multiple sources of information, is an untapped area of innovation.

There is a thus a need in the industry for improved systems and methods for dynamically re-directing communications sessions in a multimedia environment.

SUMMARY OF THE INVENTION

According to a first broad aspect, the present invention seeks to provide a method for determining location-enhanced presence information for a particular entity subscribed to a communications system. The method includes defining a set of conditional rules associated with the particular entity, obtaining a location update for the particular entity indicative of a current location of the particular entity, and obtaining a presence update for the particular entity indicative of a current activity status of the particular entity within the communications system. The method also includes applying a combination of the current location and the current activity status of the particular entity as a condition to the conditional rules for determining current location-enhanced presence information for the particular entity.

According to a second broad aspect, the present invention seeks to provide a device for determining location-enhanced presence information for a particular entity subscribed to a communications system. The device includes a first input for receiving a location update for the particular entity indicative of a current location of the particular entity and a second input for receiving a presence update for the particular entity indicative of a current activity status of the particular entity within the communications system. The device also includes a processing unit including a set of conditional rules associated with the particular entity, the processing unit being operative to apply a combination of the current location and the current activity status of the particular entity as a condition to the rules for determining current location-enhanced presence information for the particular entity.

According to a third broad aspect, the present invention seeks to provide a computer-readable storage medium containing a program element for execution by a computing apparatus to determine location-enhanced presence information for a particular entity. The program element includes computer-readable program code for detecting receipt of a location update for the particular entity indicative of a current location of the particular entity and computer-readable program code for detecting receipt of a presence update for the particular entity indicative of a current activity status of the particular entity. The program element also includes computer-readable program code for processing a combination of the current location and the current activity status of the particular entity on a basis of a set of predefined conditional rules associated with the particular entity, thereby determining location-enhanced presence information for the particular entity.

According to a fourth broad aspect, the present invention seeks to provide a method of influencing communications session routing in a multimedia communications network, the multimedia communications network including a plurality of terminals, each terminal having a display. The method includes obtaining location-enhanced presence information associated with a first entity subscribed to the multimedia communications network, the location-enhanced presence information having been determined on a basis of a combination of a current location of the first entity and a current activity status within the multimedia communications network of the first entity. The method also includes conveying the location-enhanced presence information for the particular entity to a second entity subscribed to the multimedia communications network via a display of one of the plurality of terminals.

According to a fifth broad aspect, the present invention seeks to provide a computer-readable storage medium containing a program element for execution by a computing apparatus to influence communications session routing in a multimedia communications network, the multimedia communications network including a plurality of terminals, each terminal having a display. The program element includes computer-readable program code for detecting receipt of location-enhanced presence information for a first entity subscribed to the multimedia communications network, the location-enhanced presence information having been determined on a basis of a combination of a current location of the first entity and a current activity status within the multimedia communications network of the first entity. The program element also includes computer-readable program code for conveying the location-enhanced presence information for the particular entity to a second entity subscribed to the multimedia communications network via a display of one of the plurality of terminals.

These and other aspects and features of the present invention will now become apparent to those of ordinary skill in the art upon review of the following description of specific embodiments of the invention in conjunction with the accompanying drawings.

BRIEF DESCRIPTION OF THE DRAWINGS

In the accompanying drawings:

FIG. 3 shows an example of a table of associations for John Smith, based on the different types of location-sensing technologies and locatable entities shown in FIG. 2;

FIGS. 19 to 21 illustrate different scenarios in which the presence indicator for a particular entity has been updated within the multimedia healthcare communications network, as a result of received location-enhanced information from the session redirection unit, in accordance with a non-limiting example of implementation of the present invention.

DETAILED DESCRIPTION

Figure 1:
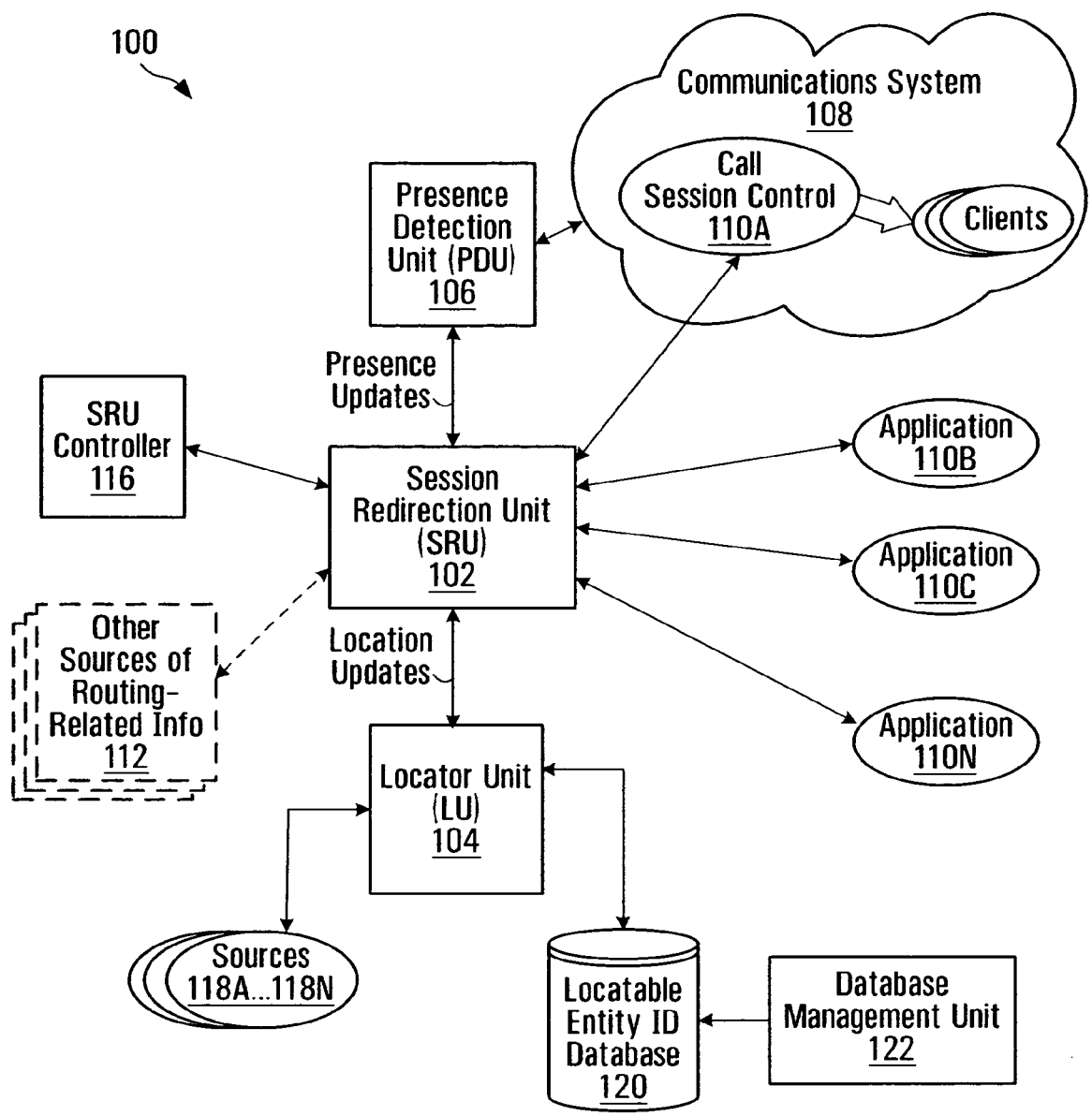
FIG. 1 is a block diagram of a system for dynamically redirecting communications sessions based on location-enhanced information, in accordance with a non-limiting example of implementation of the present invention.

FIG. 1 is a block diagram depicting a system 100 for dynamically redirecting communications sessions based on location-enhanced information, according to a non-limiting example of implementation of the present invention. The system 100 includes a Session Redirection Unit (SRU) 102, which is operative to determine location-enhanced information for a particular entity and, on the basis of this location-enhanced information, to dynamically reconfigure communications session routing to the particular entity.

For the purposes of the present specification, the term "location-enhanced information" implies descriptive information characterizing a particular entity, where this descriptive information is conditioned by a location of the particular entity.

The particular entity, which may be a person or an object, such as a computer or a machine, is subscribed to (i.e. registered with) at least one communications system 108, which provides for the establishment and/or exchange of one or more types of communications sessions between subscribed entities. Note that the novel system for dynamically reconfiguring communications session routing described herein is not limited for use with any one particular type of communications system. However, in a specific, non-limiting example, the communications system 108 is a multimedia communications system supporting different types of voice, video, image and data sessions.

Associated to each particular entity is at least one type of communications session by which the particular entity may be reached and, for each type of communications session, at least one predefined route. For example, assume the particular entity is a person named John Smith and that the communications system 108 is a multimedia communications system. In this example, John Smith is accessible via three types of communications sessions, notably: (1) voice; (2) instant message; and (3) video. Each of these types of communications sessions is associated with at least one route for accessing John Smith. For example, in order to access John Smith via a voice communications session, two possible routes are defined, notably: (1) PDA (Personal Digital Assistant); and (2) voice mailbox.

As shown in FIG. 1, the system 100 also includes a Locator Unit (LU) 104 and a Presence Detection Unit (PDU) 106, both of which are in communication with the SRU 102. The LU 104 is operative to collect location information for a particular entity from a plurality of sources 118A . . . 118N and to process this location information in order to determine a current location of the particular entity. The LU 104 provides updates of this current location to the SRU 102. The PDU 106 is operative to generate presence information for a particular entity, by detecting and monitoring the activity status of the particular entity within the communications system 108. The PDU 106 provides updates of this activity status (also referred to herein as "presence status") to the SRU 102. Both the LU 104 and the PDU 106 will be discussed in further detail below.

Optionally, the SRU 102 may accept data from one or more other specific sources 112 of routing-related information, assuming that these sources 112 undergo a successful registration with the SRU 102. These other sources 112 provide additional information relevant to communications session routing for different entities, where this information may be combined by the SRU 102 with location information from the LU 104 and/or presence information from the PDU 106 for use in dynamically reconfiguring communications session routing. Examples of other sources 112 of routing-related information may include a database storing shift or equipment schedules, as well as an entity profile database storing personal/entity calendars, among many other possibilities.

The SRU 102 is operative to generate location-enhanced information for a particular entity on the basis of a combination of the current location of the respective entity and at least one other type of information affecting routing of communications sessions to the respective entity. The at least one other type of information affecting routing of communications sessions to the respective entity may be the current activity status of the respective entity or some other routing-related data specific to the respective entity received from an external source 112.

Upon receipt of a location update from the LU 104, an activity status update from the PDU 106 or an update of routing-related data from an external source 112, the SRU 102 is operative to update the location-enhanced information for the respective entity. On the basis of this updated location-enhanced information, the SRU 102 determines whether reconfiguration of the communications session routing for the respective entity is required. If the SRU 102 determines that reconfiguration is required, the SRU 102 is operative to dynamically update the predefined route(s) associated with each type of communications session destined for the particular entity and to ensure that the updated routes are applied within the communications system 108.

Note that, in an alternative, the SRU 102 may proceed directly to reconfiguring the communications session routing for a particular entity upon receipt of a location update or a presence status update for the respective entity, without first determining the resulting location-enhanced information. More specifically, on the basis of a received location update from the LU 104 or a received presence update from the PDU 106, the SRU 102 is capable to determine whether reconfiguration of the communications session routing for the respective entity is required. If reconfiguration is required, the SRU 102 will thus dynamically update the predefined route(s) associated with each type of communications session destined for the particular entity, on the sole basis of the received location or presence update.

An SRU controller 116 is coupled to the SRU 102 and provides for configuration and control of the operation of the SRU 102 itself. More specifically, the parameters of the processing performed by the SRU 102 on the information received from the PDU 106 and LU 104, as well as on any data obtained from another external source, are determined by registered users and administrators of the system 100 via the SRU controller 116, as will be discussed in further detail below.

The routing reconfiguration determined by the SRU 102, as well as possibly the updated location-enhanced information, is made available by the SRU 102 to various different applications 110A . . . 110N (also referred to herein as applications 110). In the example of FIG. 1, the application 110A is a call session control function of the communications system 108. The call session control function of the communications system 108 therefore applies and enforces the routing reconfiguration determined by the SRU 102.

It should be noted that many different types of applications 110, in various different scenarios, could make use of the information generated by the SRU 102, notably routing reconfiguration and/or location-enhanced information, without departing from the scope of the present invention. In one possible example, one of the applications 110 is a security alerting application that is designed to issue security alerts to law enforcement and/or security personnel (i.e. police officers, security guards, etc.). This application could use the information provided by the SRU 102 to target specific law enforcement or security personnel with a certain boundary and/or in a certain geographic region when issuing a particular security alert. For example, the application could issue a security alert to all security guards located in a particular zone that are not engaged in another emergency communications session, on the basis of location-enhanced information obtained from the SRU 102. In another possible example, one of the applications 110 is a sales clerk tracking program designed for use within a store. This application could use the information provided by the SRU 102 to target specific sales clerks within a business establishment when a customer requires assistance. For example, the application could contact the sales clerk located nearest to a particular location that is not already engaged in a voice session.

In yet another possible example, one of the applications 110 is a rapid team formation application that is designed to rapidly form a team of locatable entities (people and/or equipment) on the basis of location, communications status and/or schedule/calendar information. This application could use the information generated by the SRU 102 to identify designated entities that are in proximity to an event location and that are currently available to participate in the team. The application may then notify the selected team members via the communications system 108, for example with an audible alarm accompanied by textual or audible location information. In a specific example, the application could be used in a healthcare establishment to rapidly form a team of appropriate medical staff and equipment urgently needed at an emergency location, on the basis of location-enhanced information obtained from the SRU 102. The location-enhanced information made available by the SRU 102 may assist the rapid team formation application in determining who the team members should be and how the team should be formed.

In a specific, non-limiting example of implementation, each component of the system 100, including in particular the SRU 102, the LU 104 and the PDU 106, is software implemented on one or more computing platforms, such as a server and plurality of client computing apparatuses. In the case of multiple computing apparatuses, the latter are all interconnected in a network. In one example, the system 100 is implemented in a public network, such as the Internet. In other examples, the system 100 is implemented in a private network, such as an Intranet, LAN, WAN, VPN or any other suitable network. Each computing platform comprises a processor, such as a CPU, a memory and a network I/O (input/output) for connecting to the system network. Each computing platform stores in its memory one or more program elements which, when executed by the processor, implement one or more functions of the system 100.

Locator Unit 104

Figure 2:
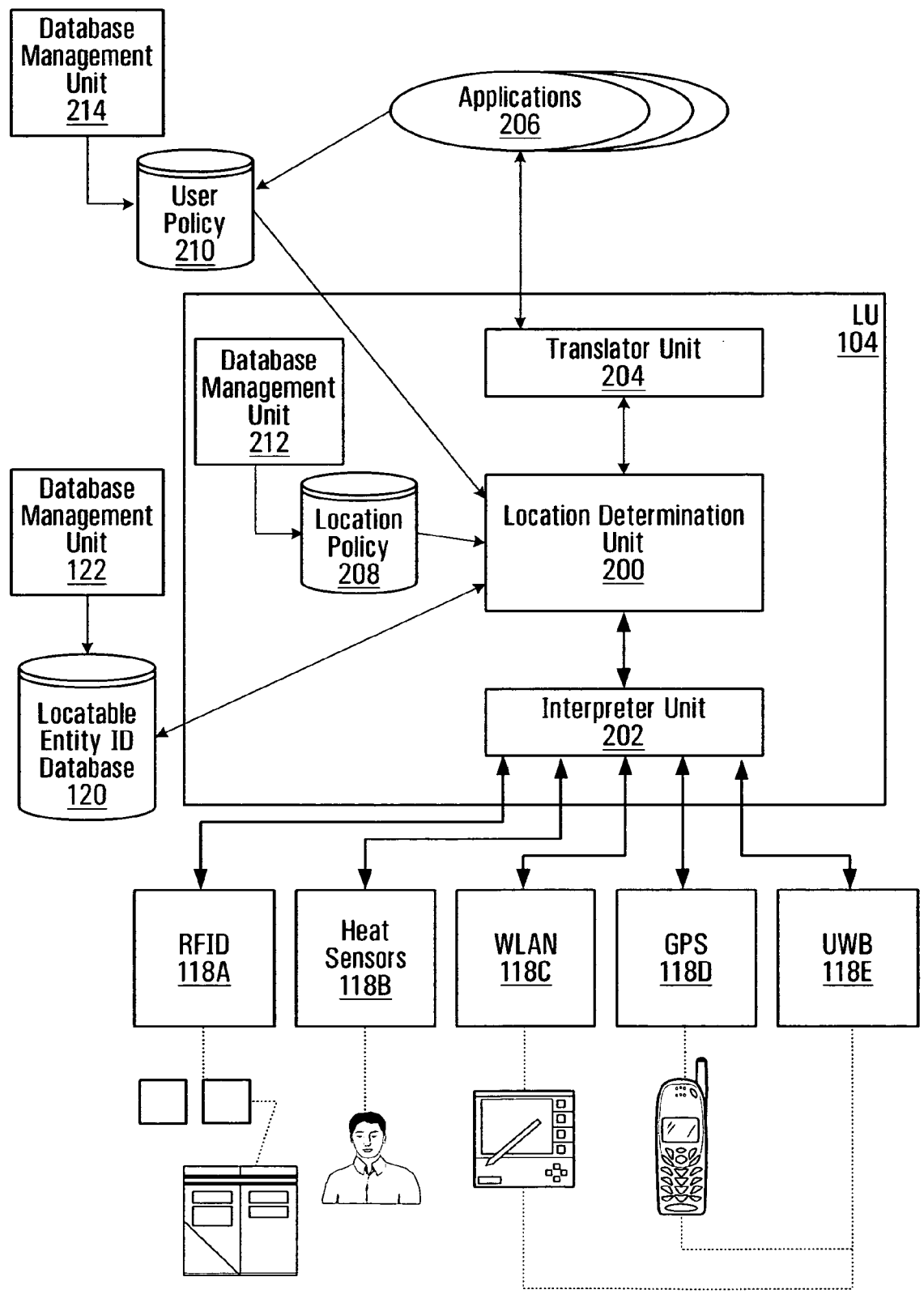
FIG. 2 is a functional block diagram of a locator unit, in accordance with a non-limiting example of implementation of the present invention.

FIG. 2 is a functional block diagram of the LU 104, according to a non-limiting example of implementation of the present invention. As seen in FIG. 1, the LU 104 communicates with a plurality of sources 118A . . . 118N of location information, also referred to as sources 118. Each of these sources 118 is an instance of a known location-sensing technology, such as GPS, RFID, Wi-Fi WLAN and Ultra Wideband (UWB), to name but a few possible examples. These known location-sensing technologies operate on different parameters and use different techniques; however, they all generate location information allowing to pinpoint a location or a closest location for a locatable entity. Since each of these known location-sensing technologies has been well documented, it is not deemed necessary to discuss herein the details of their respective functionality.

Note that, in the context of the present invention, a locatable entity is a person or an object that can be located, either directly via a location-sensing technology or indirectly by association. A locatable entity has one or more proxy identifiers, each of which is associated with an instance of a location technology that can provide a possible location of the respective locatable entity. Examples of a locatable entity include a person, a cellular telephone and an RFID tag, among many other possibilities. Taking the above example of John Smith, proxy identifiers for John Smith may include his RFID badge (active or passive), his cellular telephone and his Wi-Fi enabled laptop, among other possibilities. Note that each of the proxy identifiers for John Smith is also representative of a respective locatable entity, distinct from John Smith.

In the non-limiting example shown in FIG. 2, the LU 104 obtains location information from instances of RFID technology 118A, heat sensor technology 118B, WLAN technology 118C, GPS technology 118D and Ultra Wideband (UWB) technology 118E, allowing to locate five different types of locatable entities, notably people, equipment, RFID tags, tablet personal computers and cellular telephones. Note that different types of location-sensing technology and different types of locatable entities may be provided without departing from the scope of the present invention.

The LU 104 is coupled to a database 120 storing information on the various different locatable entities tracked by the LU 104. This information includes, for each locatable entity, a unique identifier as well as one or more proxy identifiers. Furthermore, for each locatable entity, the database 120 includes a data structure, such as a table or a linked list, defining associations between the respective locatable entity and one or more other locatable entities, where these other locatable entities may act as proxy identifiers for the respective locatable entity. The associations defined in the data structure may enable to determine a location or a closest location for the respective locatable entity even when no specific location information is available via location-sensing technology. Note that several different locatable entities may share a common data structure of associations, where these different locatable entities act as proxy identifiers for one another.

As seen in FIGS. 1 and 2, the system 100 includes a database management unit 122 coupled to the database 120. This database management unit 122 provides for the management and updating of the content of the database 120. In a specific, non-limiting example, the database management unit 122 includes a user-friendly interface that is displayed to an authorized and authenticated administrator or user of the system 100 via a workstation monitor, for enabling the administrator/user to view and update the content of the database 120. Alternatively, the database management unit 122 may be implemented by the LU 104. In yet another alternative, the SRU controller 116 is coupled to the database 120 and provides for the management and updating of its content, such that no separate database management unit 122 is needed.

FIG. 3 illustrates a non-limiting example of a table of associations for the locatable entity known as John Smith, based on the different types of location-sensing technologies and locatable entities shown in FIG. 2. In this non-limiting example, text-based associations are defined between the locatable entity John Smith and five other locatable entities, notably John's RFID badge, John's cellular telephone, John's tablet personal computer, a piece of equipment X and equipment X's tag. In this particular example, three of the five other locatable entities may qualify as proxy identifiers for John Smith, notably John's RFID badge, John's cellular telephone and John's tablet. As seen in FIG. 3, different types of associations exist, including direct ("D"), indirect ("I") and null ("N"). A direct association exists between a locatable entity and itself when a location-sensing technology is capable to track that locatable entity, for example John's cellular telephone (tracked by GPS). An indirect association exists between two different locatable entities when locating one of the two provides a degree of certainty as to the location of the other, for example John Smith and John's badge. When no relationship exists between two locatable entities, the association is characterized as null, for example John Smith and equipment X's tag. Whether an association is direct or indirect, it may be characterized as strong ("S"), moderate ("M") or weak ("W"), depending on its reliability for determining the true location of the concerned locatable entities. For example, the indirect association between John Smith and John's badge is characterized as strong, since the likelihood of John's badge being in the same location as John Smith is high. In another example, the direct association between John Smith and his own heat signature is characterized as weak, since the reliability of heat sensor technology 118C for locating a person is known to be relatively low.

As shown in FIG. 2, the LU 104 includes a location determination unit 200, an interpreter unit 202 and a translator unit 204.

The interpreter unit 202 is operative to exchange data with the different sources of location information 118, thus providing an interface between the LU 104 and the various instances of location-sensing technology. More specifically, the interpreter unit 202 provides a common set of functions to handle different instances of different types of location-sensing technologies, including for example a registration function and a location data pull function. In particular, the interpreter unit 202 is capable to request location data from different instances of location-sensing technologies 118 and to interpret received location data in order to extract therefrom identity, location and/or proximity information for one or more locatable entities. The term "interpret" is used since the data signals received by the interpreter unit 202 from the different instances of location-sensing technologies 118 may by characterized by different formats and/or data structures. The interpreter unit 202 provides the extracted identity, location and/or proximity information to the location determination unit 200.

Note that each instance of a location-sensing technology may generate several different types and/or granularities of location information for any locatable entity that it succeeds in locating. Furthermore, different instances of the same location-sensing technology may generate identical location information for a particular locatable entity, while different instances of different location-sensing technologies may generate different but related location information for the same locatable entity and/or its respective proxy identifiers. The interpreter unit 202 provides all extracted identity, location and/or proximity information to the location determination unit 200, regardless of any redundancy or relationships therebetween.

The translator unit 204 is operative to communicate with at least one external application 206, thus providing an interface between the LU 104 and the at least one application 206 that may wish to make use of the locating services provided by the LU 104. More specifically, the translator unit 204 provides a common set of functions to handle communications with different applications, including for example a registration function and a location data push function. In particular, the translator unit 204 intercepts and translates incoming location requests from the at least one application 206, and instructs the location determination unit 200 accordingly. Furthermore, the translator unit 204 translates the location information received from the location determination unit 200 prior to sending it out to the at least one application 206, such that the data sent out is characterized by an appropriate format and data structure previously negotiated with the at least one application 206 during registration.

Note that where the translator unit 204 communicates with multiple different applications 206, the translator unit 204 may have to handle incoming location requests in different computing languages. It should also be noted that a location request received by the translator unit 204 from an application 206 may specify that the location information be obtained from a specific instance of location-sensing technology 118.

Specific to the present invention, one of the at least one application 206 in communication with the translator unit 204 is the SRU 102, as shown in FIG. 2. Another such application 206 may be the communications system 108 or the call session control function 110 of the communications system 108.

The location determination unit 200 is operative to collect, process and store location data received from various instances of location-sensing technologies 118 via the interpreter unit 202, and to provide current location information to the translator unit 204 for transmission to the at least one external application 206. More specifically, the location determination unit 200 is operative to process the identity, location and/or proximity information received from the interpreter unit 202, in combination with stored historical location information, as well as the locatable entity association information stored in the database 120, in order to determine updated location information for locatable entities. The location determination unit 200 is capable to recognize and handle redundancy in the identity, location and/or proximity information received from the interpreter unit 202. The historical location information collected and stored by the LU 104 may be updated and maintained by a dedicated processor within the LU 104 or, alternatively, by the SRU 102.

Note that the location determination unit 200 accesses the database 120 when attempting to determine the current location of a particular locatable entity, in order to take into consideration the association information stored in the database 120 for that particular locatable entity. Notwithstanding this capability of the location determination unit 200, the latter may also be capable to identify related identity, location and/or proximity information for a particular entity and its proxy identifiers and to automatically map this related information to the particular entity.

The location determination unit 200 operates on the basis of predefined policies, which are applied to the collected and stored identity/location/proximity/association information by the location determination unit 200 during processing. It is these predefined policies that allow the location determination unit 200 to determine the updated location information for locatable entities.

For the purposes of the present description, a policy is a set of conditional rules, each rule mapping a particular condition to a particular outcome. In the case of the location determination unit 200, each particular condition concerns one of, or a combination of, the collected and stored identity/location/proximity/association information for a particular entity, while each particular outcome defines location information for a particular entity.

In a specific, non-limiting example, the predefined policies applied by the location determination unit 200 include location policy 208 and user policy 210, as seen in FIG. 2. In a specific, non-limiting example, a location policy rule may be that "any locatable entity can be located in the case of an emergency". In another specific, non-limiting example, a user policy rule may be that "entity John Smith can designate himself as being not locatable".

In the example of FIG. 2, the location policy 208 is built into the LU 104, while the user policy 210 is stored externally but made available to the LU 104 by the at least one application 206 calling upon the LU 104. The present invention is not limited to any particular storage configuration of these pre-defined policies, where each such policy may be either built into the LU 104 or stored externally to the LU 104. In FIG. 2, database management units 212, 214 provide for the management and updating of the content of the location and user policy databases 208, 210, respectively. Each of these database management units 212, 214 may be implemented either by the LU 104 (as shown for database management unit 212) or external to the LU 104 (as shown for database management unit 214). In the case of the user policy 210, the latter may alternatively be managed and updated by one or more of the applications 206, such that a separate database management unit 214 is not needed.

Note that the translator unit 204 may also apply an authentication policy in the context of its registration function, in order to determine whether or not a requester (i.e. an application 206) is authorized to receive location information for a particular locatable entity.

It should also be noted that the locator unit 104 is capable to automatically collect location information from the different sources 118 on a continuous, periodic or intermittent basis. The collection of location information by the locator unit 104 may also be performed specifically in response to a request for such location information from an external application 206.

Presence Detection Unit 106

As mentioned above, the PDU 106 provides the SRU 102 with presence information for the various entities subscribed to the communications system 108. More specifically, the PDU 106 detects the activity status of the different entities within the communications system 108 and makes this activity status available to the SRU 102 and possibly to other applications. Taking the above example of John Smith subscribed to a multimedia communications system 108, the PDU 106 may detect that the current activity status for John Smith within the multimedia communications system is "connected active", "connected inactive", "active on the phone" or "active at station X", among many other possibilities. It should be noted that the activity status for a particular entity as detected by the PDU 106 may include the type and/or capabilities of the communications activity of the particular entity (e.g. whether voice, video, and/or instant messaging is supported; which display capabilities are supported).

Note that the functionality and operation of the PDU 106 will be discussed further below, in the context of the communications system 108.

In the example of FIG. 1, the PDU 106 provides continual updates of this activity status to the SRU 102. Alternatively, the PDU 106 may store the continually updated activity status information for the various entities subscribed to the communications system 108 in a data structure (such as a database), and enable the SRU 102 and possibly other applications to access this data structure. The data structure storing the updated activity status information may be a component of the PDU 106 or, alternatively, may be coupled to the PDU 106.

The PDU 106 is shown in the example of FIG. 1 as being a standalone functional unit coupled to the communications system 108. The PDU 106 may also be coupled to a plurality of different communications systems, responsible for monitoring the activity status of entities across all of the different communications systems. Alternatively, the system 100 may include multiple distinct PDUs, each PDU interacting with a respective communications system and being in communication with the SRU 102 for providing presence status updates thereto. In yet another alternative, the PDU 106 is a component or a sub-component of the communications system 108, adapted to communicate externally with the SRU 102, as seen in FIG. 4.

Communications System 108

Figure 4:
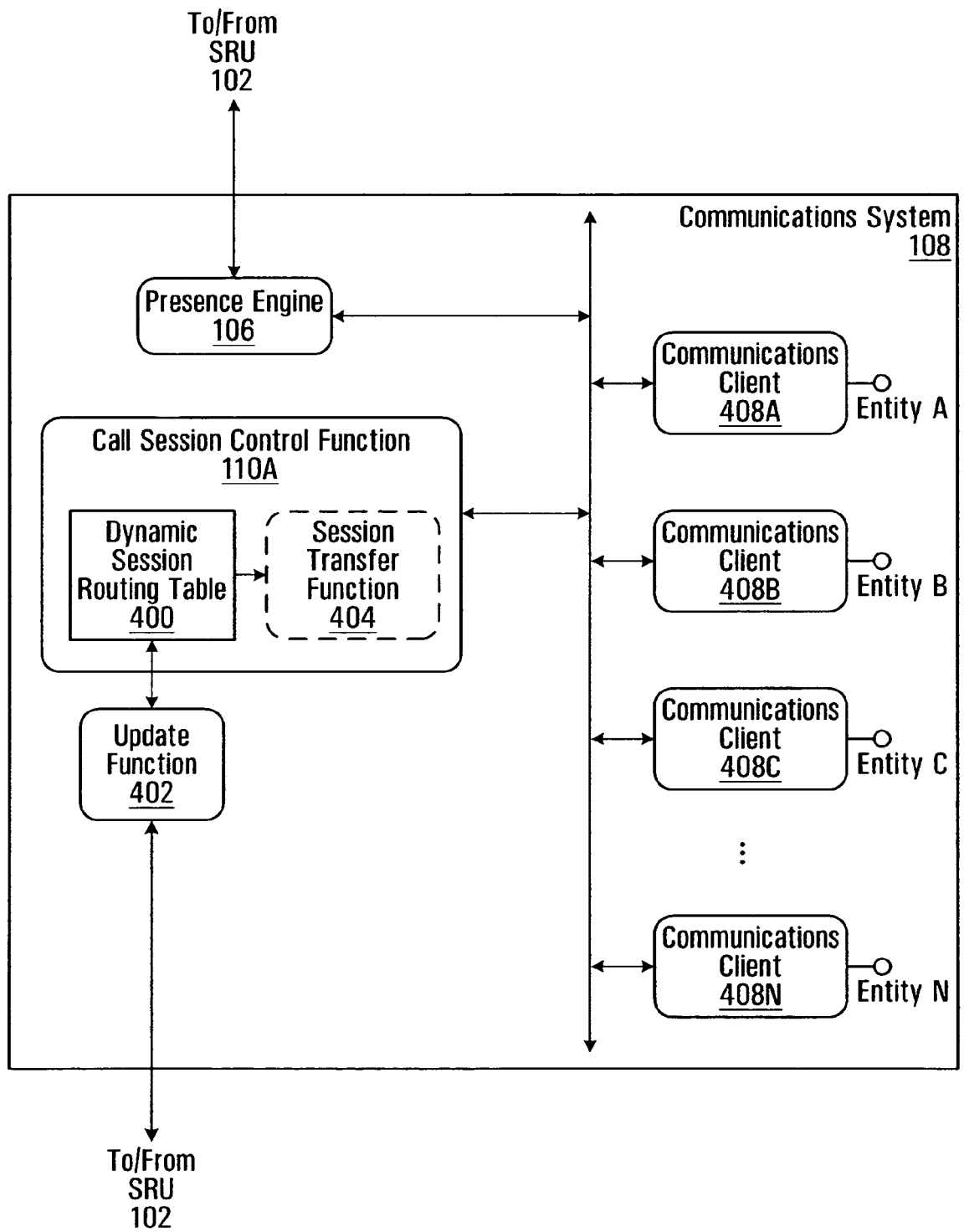
FIG. 4 is a block diagram illustrating the simplified functionality of a multimedia communications system, in accordance with a non-limiting example of implementation of the present invention.

FIG. 4 is a functional representation of a typical multimedia communications system 108, simplified for clarification purposes, according to a non-limiting example of implementation of the present invention. Although not shown, such a multimedia communications system 108 includes a plurality of fixed terminals, such as stationary workstations, and/or a plurality of mobile terminals, such as personal digital assistants (PDAs) or tablet personal computers. Each of these terminals has a display, via which users of the communications system 108 can initiate and exchange communications sessions with one another. The communications system 108 includes a call session control function (CSCF) 110A operative to control the establishment and routing of a variety of multimedia communications sessions between the entities subscribed to the communications system 108. The CSCF 110A includes a dynamic session routing table 400, which stores current routing information for the various communications sessions that may be established within the communications system 108. Note that the functionality and implementation of the CSCF 110A of a typical communications system 108 have been thoroughly documented and are well known to those skilled in the art, such that they will not be discussed in further detail herein. The CSCF 110A communicates with a plurality of communications clients 408A ... 408N (also referred to as clients 408), each of which provides a client interface to the communications system 108 for a respective entity via a respective fixed or mobile terminal. Each of the communications clients 408 is capable to support communications sessions, by providing one or more types of multimedia information to the associated entity, such as voice, video, pictures and data.

Specific to the present invention, the communications system 108 implements an update function 402 that interfaces with the dynamic session routing table 400 of the CSCF 110. This update function 402 is operative to dynamically update the routing information stored in the dynamic session routing table 400 of the CSCF 110A, on the basis of routing reconfiguration information received from the SRU 102. Optionally, the CSCF 110A includes a session transfer function 404 operative to automatically detect changes in the dynamic session routing table 400 and, on the basis of these changes, to transfer communications sessions currently in progress to new destinations. The session transfer function 404 also notifies the respective entities of any such transfers via the communications clients 408. Optionally, the session transfer function 404 may request authorization from a particular entity prior to transferring an active communications session of the particular entity. Although shown in FIG. 4 as being implemented by the CSCF 110A, the optional session transfer function 404 may alternatively be implemented as a separate component of the communications system 108, external to the CSCF 110A but in communications therewith via a dedicated interface.

As seen in FIG. 4, the communications system 108 also includes a PDU 106, commonly referred to in the context of communications systems as a presence engine 106. As described above with regard to the PDU 106 of the present invention, the presence engine 106 makes updated activity status information available to various different applications, including the SRU 102 and each of the communications clients 408. The determination of the presence or activity status of a particular entity subscribed to the communications system 108 shown in FIG. 4 is partly automatic and partly manual. More specifically, the presence engine 106 monitors and automatically detects the type, status and/or capabilities of the computer and/or communications activity of a particular entity, while the communications system 108 allows the particular entity to submit and/or modify its presence information via the respective communications client 408. As is typical in existing multimedia communications systems, a presence indicator is used to provide a particular entity with presence information for another entity. This presence indicator is a feature of the interface displayed by each communications client 408 to the respective entity.

In the context of a typical communications system, the information detected by the presence engine 106 is used to indicate the communications capabilities of a particular entity to other system users. Specific to the present invention, this information is also used to adapt communications session routing to the capabilities of the end terminals and to appropriately adapt the presentation of information. Furthermore, the presence engine 106 of the multimedia communications system 108 is operative to influence communications session routing to a particular entity within the multimedia communications system 108, on the basis of location-enhanced information obtained from the SRU 102. In a specific, non-limiting example, the presence engine 106 is responsive to the receipt of updated location or location-enhanced presence information from the SRU 102 to update the presence indicator for the respective entity. More specifically, the presence engine 106 will update the presence indicator to include therein the updated location or location-enhanced presence information, in addition to the current activity status of the particular entity within the communications system 108.

Since the above-discussed components and sub-components of a communications system are well known to those skilled in the art, they will not be discussed in further detail herein. Furthermore, since the operation and implementation of the PDU 106 of the present invention are substantially identical to that of the known presence engine of a typical multimedia communications system, they will not be described in further detail herein.

Session Redirection Unit 102

Figure 5:
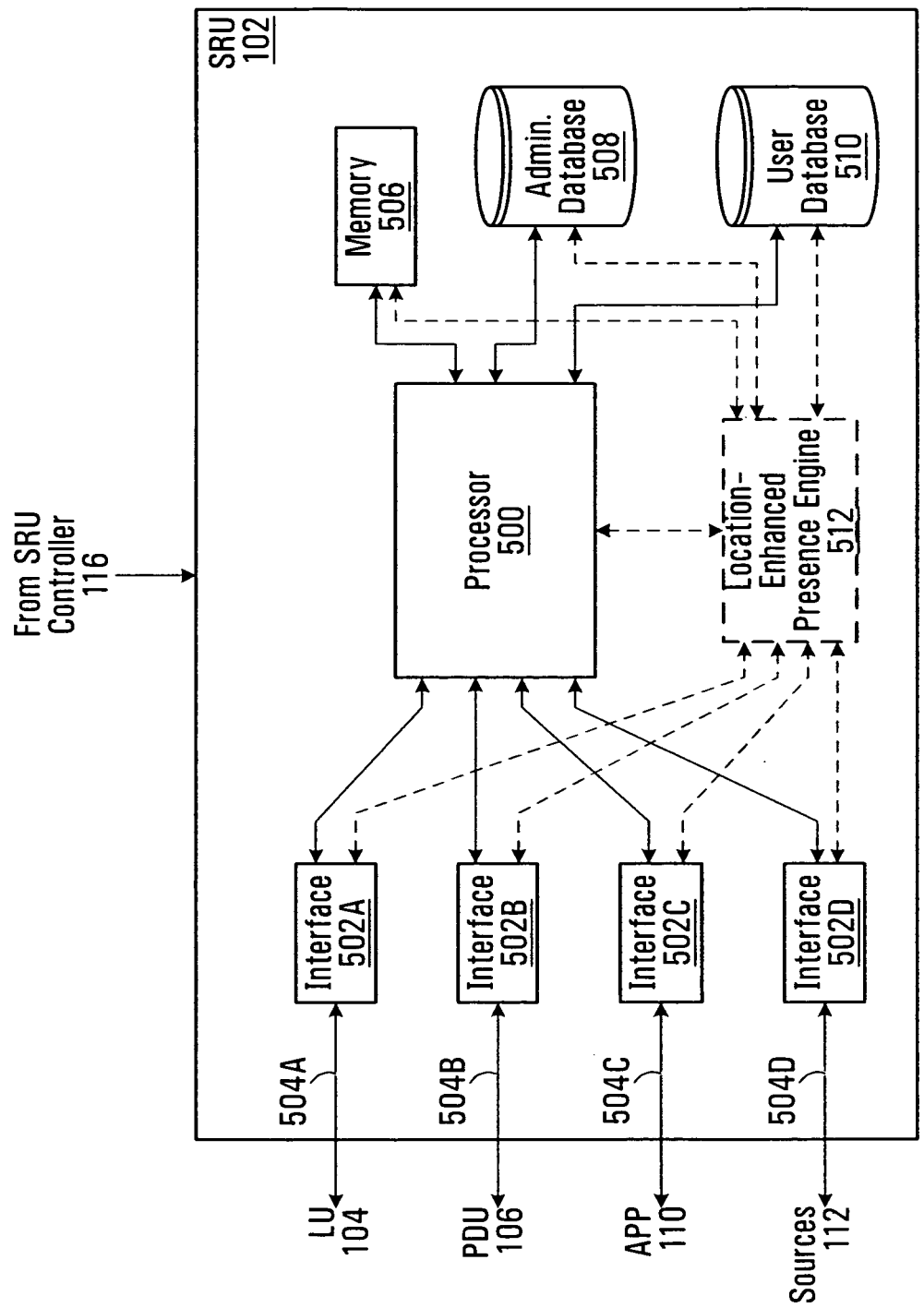
FIG. 5 is a functional block diagram of a session redirection unit, in accordance with a non-limiting example of implementation of the present invention.
Figure 7:
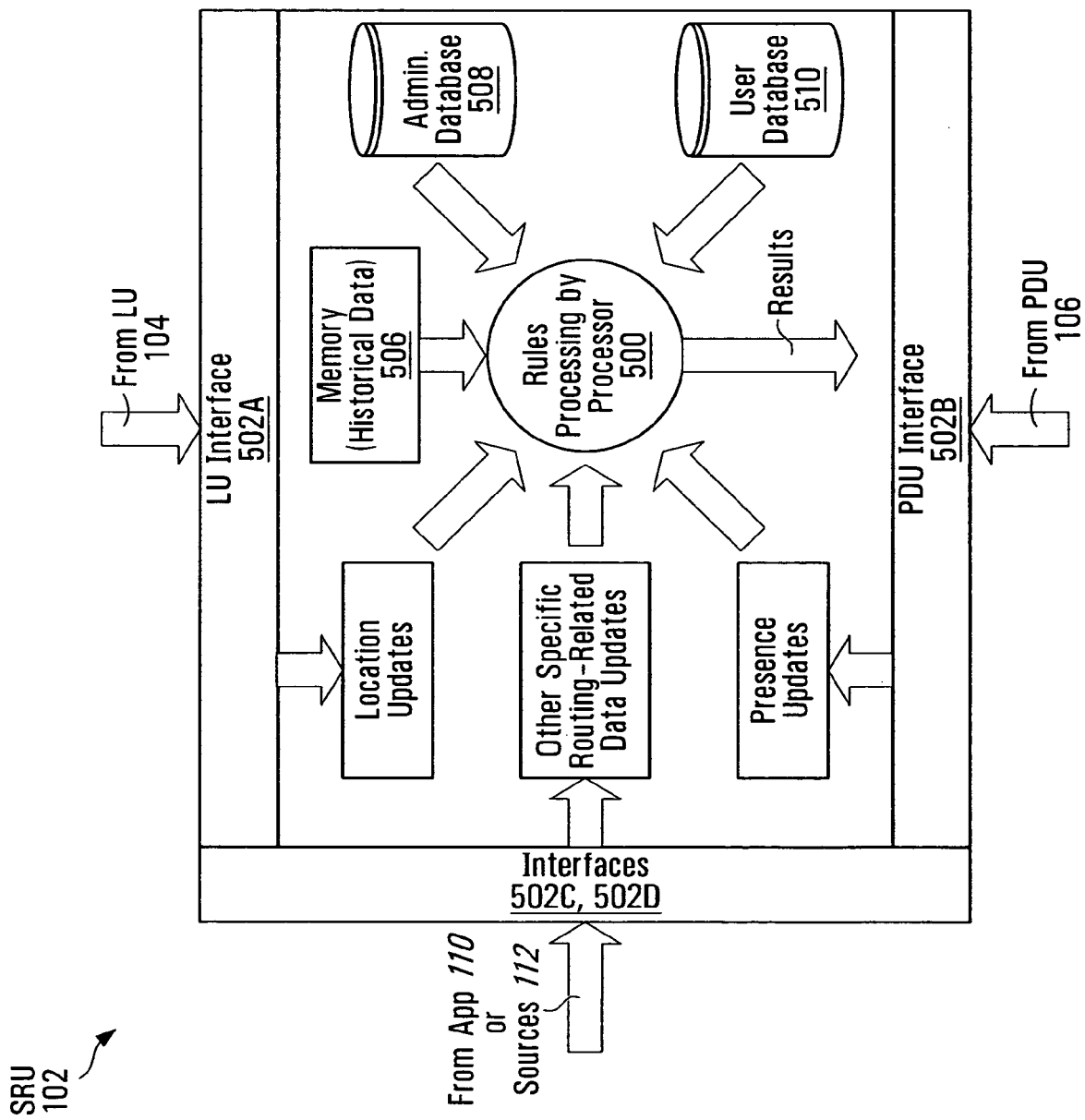
FIG. 7 is a block diagram illustrating the data flow within the session redirection unit, in accordance with a non-limiting example of implementation of the present invention.

FIG. 5 is a block diagram of the SRU 102, while FIG. 7 illustrates the flow of data within the SRU 102, according to a non-limiting example of implementation of the present invention.

As seen in FIG. 5, the SRU 102 includes a processor 500, a memory 506, an administrative database 508, a user database 510 and a plurality of interfaces 502A, 502B, 502C and 502D.

Each interface of the SRU 102 is operative to provide a portal for communications to and from the SRU 102. More specifically, each interface is adapted to communicate and coordinate with one or more external sources with which the SRU 102 exchanges data signals. In the example of FIG. 5:

interface 502A enables communication exchanges between the SRU 102 and the LU 104, via the input/output 504A;

interface 502B enables communication exchanges between the SRU 102 and the PDU 106, via the input/output 504B;

interface 502C enables communication exchanges between the SRU 102 and a remote application, such as the call session control function 110A of the communications system 108, via the input/output 504C (note that if the SRU 102 is in communication with several remote applications, the SRU 102 may include several interfaces 502C); and optional interface 502D enables communication exchanges between the SRU 102 and an optional external source 112 of routing-related information, via the input/output 504D (note that if the SRU 102 is in communication with several distinct external sources 112 of routing-related information, the SRU 102 may include several interfaces 502D).

These interfaces of the SRU 102 all perform standard, well-known functionality relating to the exchange of data communications, such as data streaming, push/pull commands, translation functions for data and command interpretation, event configuration, notifications, and provisioning, among other possibilities. Each interface also implements a registration process with its respective external source(s), in order to negotiate and establish parameters defining the communications between the external source and the interface, such as the format, nature and timing of exchanged information elements. Furthermore, each interface is capable to perform source-specific operations and/or applications dependent on the particular requirements of the external source in communication with the respective interface.

Taking for example the interface 502A, this interface is operative to enable communications exchanges between the SRU 102 and the LU 104. The interface 502A thus implements a registration process with the translator unit 204 of the LU 104, in order to establish the format, nature and timing of the location information (also referred to herein as location updates) received from the LU 104. In a specific, non-limiting example, this registration process establishes that the location information received from the LU 104 will consist of location coordinates in the form of (x,y,z) or (degrees, minutes, seconds) with a specific accuracy and a locatable entity identifier in the form of a number or a textual tag. In another example, during the registration process, interface 502A requests location information from the LU 104 in the format "Zone X", but the translator unit 204 of the LU 104 determines that this format is not available and replies "only (x,y,z) available". In this case, the interface 502A will only agree to accept location information from the LU 104, if both formats are acceptable to the SRU 102 or if the interface 502A is capable to implement an appropriate conversion function. Note that the data required by the interface 502A in order to be able to perform this conversion function would be obtained via the SRU controller 116.

Taking for example the interface 502B, this interface is operative to enable communications exchanges between the SRU 102 and the PDU 106. The interface 502B thus implements a registration process with the PDU 106, in order to establish a commonly agreed upon format for the presence information received from the PDU 106. For example, the agreed upon format may be a set of predefined text attributes, such as "on-line", "active-available", "active in a voice session" or equivalent commonly understood codes, among many other possibilities.

Note that various different implementations of the interfaces 502A-502D of the SRU 102 are possible without departing from the scope of the present invention. These interfaces may adopt text-based, XML or SIP formats for communications exchanges with their respective external sources, among other possibilities. Each of these interfaces will also typically contain middleware implementing specific applications, for example an application enabling communication between the interface 502C and the update function 402 of the communications system 108.

The processor 500 of the SRU 102 is operative to process the different types of information received from, or made available by, the LU 104, the PDU 106, remote applications (such as the communications system 108), as well as other possible external sources 112 of information, in order to intelligently combine location information for a particular locatable entity with other routing-related data for the particular locatable entity. In a specific, non-limiting example of implementation, the receipt of a location update from the LU 104, an activity status update from the PDU 106 or an update of routing-related data from another external source, triggers the processor 500 to generate and/or update location-enhanced information for the respective entity, as well as possibly update the predefined route(s) associated with each type of communications session destined for the particular entity.

The processor 500 contains and operates on the basis of a plurality of predefined rules that intelligently combine the location, presence and other specific routing-related information for a particular entity with predetermined policy. Processing of these rules by the processor 500 results in the generation of location-enhanced information for the particular entity, as well as possibly the modification of session routing for the particular entity.

Note that the predefined rules associated with a particular entity are defined to the processor 500 at least in part by an administrator, as well as possibly by the particular entity, via the SRU controller 116. In a specific, non-limiting example, the SRU controller 116 includes a user-friendly interface that is displayed to a registered administrator or user of the system 100 via a workstation monitor. The interface provides for authentication of the administrator/user by the SRU controller 116 and, if authentication is successful, allows the administrator/user to define and/or modify the set of predefined rules associated with a particular entity.

The rules of the processor 500 may each be associated with a particular entity or with a group of entities. In a specific example, the processor 500 operates on the basis of a rules table, within which predefined rules are mapped to one or more locatable entity identifiers. Alternatively, the processor 500 may operate on the basis of a plurality of different rules tables, each table being associated with one or more locatable entity identifiers.

The administrative database 508 and the user database 510 together define the predetermined policy used by the processor 500 to generate location-enhanced information and/or modify session routing for various entities. The administrative database 508 contains administrative policies for different groups/users/entities, where these policies may be based on work schedules, location visibility (for example: whether or not a user can be located when in a particular room) and trigger descriptions (for example: a trigger can be set for entering a particular room). The user database 510 contains personal (group/entity/user) preferences, based on personal/entity calendars, location visibility and trigger descriptions. Typically, the user/entity preferences of the user database 510 are governed and can be overridden by the administrative policy of the administrative database 508.

In the example of FIG. 5, the administrative and user databases 108, 110 are shown as being implemented within the SRU 102. Alternatively, the administrative and user databases 108, 110 may be implemented externally to the SRU 102. In the latter case, the databases 108 and 110 would be coupled to the SRU 102 for providing the SRU 102 with the necessary policy information. In either case, the content of these databases 508, 510 is configured and updated by authenticated authorized personnel (such as registered users or administrators) via the SRU controller 116. Alternatively, the databases 508, 510 may be coupled to one or more database management units or interfaces, the latter being dedicated to the management and update of the content of the administrative and user databases 508, 510. These database management units or interfaces may be implemented by the SRU 102 or may be external to the SRU 102.

Figure 6:
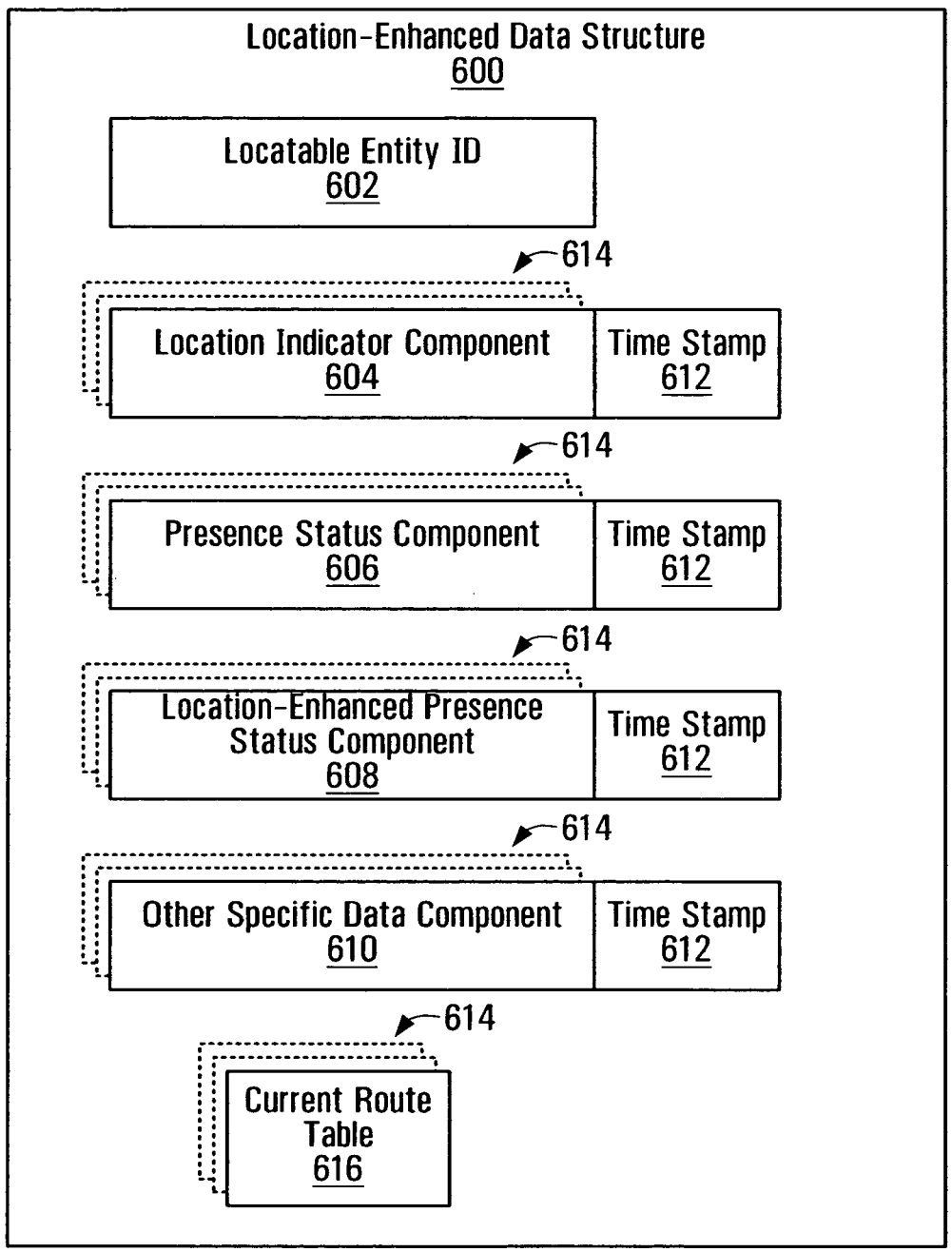
FIG. 6 depicts an example of a location-enhanced data structure generated by the session redirection unit, in accordance with a non-limiting example of implementation of the present invention.

The processor 500 of the SRU 102 creates and manages several Location-Enhanced (LE) data structures, which are stored in the memory 506. Each LE data structure is associated with a particular locatable entity and stores location-enhanced-related datum for the respective locatable entity. FIG. 6 illustrates a non-limiting example of an LE data structure 600, which contains a locatable entity identifier 602, as well as a location indicator component 604, a presence status component 606 and, optionally, a location-enhanced presence status component 608 and other specific data component(s) 610 related to the respective locatable entity. With the exception of the locatable entity identifier 602, each component 604, 606, 608, 610 of the LE data structure is associated with a specific timestamp 612, as well as possibly with respective historical data 614.

As seen in FIG. 6, the LE data structure 600 for a particular locatable entity also includes a current route table 616. This current route table defines a current set of communications session routes (i.e. sources/destinations) for the respective locatable entity. Optionally, the LE data structure 600 also stores historical data 614 associated with the current route table 616.

The processor 500 of the SRU 102 builds and updates the LE data structure 600 for a particular locatable entity on the basis of information received from the LU 104, the PDU 106 and other specific external sources 112 of routing-related information, as well as its own rules-based processing. More specifically, the location indicator component 604 and its associated timestamp 612 are derived from a location update for the particular locatable entity received from the LU 104. The presence status component 606 and its associated timestamp 612 are derived from an activity status update for the particular locatable entity received from the PDU 106. The optional data component 610 and associated timestamp 612 are derived from information associated with the particular locatable entity received from an optional external source 112 of routing-related information. The current route table 616 is derived from information received from the communications system 108 or, more specifically, the call session control function 110A of the communications system 108.

Note that at least a portion of the contents of the LE data structure 600 for a particular locatable entity may be made available to an authorized administrator/user of the system 100, via the user-friendly interface of the SRU controller 116, for use in defining/modifying the set of predefined rules associated with the particular entity. Accordingly, the authorized administrator/user is able to define/modify the set of predefined rules associated with the particular entity on the basis of current and historical location, presence and location-enhanced presence information associated with the particular entity.

The processor 500 performs rules-based processing on the locatable entity identifier 602, the location indicator component 604 and the presence status component 606, as well as, optionally, the location-enhanced presence status component 608, the other specific data components 610 and the current route table 616 of each LE data structure 600. In other words, for a particular locatable entity, the processor 500 inputs any individual one, a combination, a sub-combination or all of the location indicator component 604, presence status component 606 and, optionally, the location-enhanced presence status component 608, the other specific data components 610 and the current route table 616 to a set of predefined rules associated with that particular locatable entity. The processor 500 may also input the timestamp and/or historical data associated with each component, as well as possibly data (e.g. location information, presence information, route table, etc) associated with other locatable entities, such as proxy identifiers for the particular locatable entity.

The output from this rules-based processing is a specific set of data and/or commands related to location-enhanced information for the particular locatable entity, as well as possibly other locatable entities. A specific example of output data generated by this rules-based processing is an updated location-enhanced presence status component 608 and associated timestamp for the particular locatable entity, which are added by the processor 500 to the LE data structure 600 of the particular locatable entity. Another specific example of such output data is a new route table for the particular locatable entity, which the processor 500 uses to update the current route table 616 of the respective LE data structure 600. Another specific example of such output data is a plurality of new route tables for respective locatable entities, where the multiple locatable entities may be proxy identifiers for one another or may form part of a specific group of locatable entities.

A specific example of output commands generated by the rules-based processing is a set of one or more commands directed to the call session control function 110A of the communications system 108, for updating the session routing table associated with the particular locatable entity, as well as possibly other locatable entities. Another specific example of output commands generated by the rules-based processing is a set of one or more commands directed to the call session control function 110A of the communications system 108, for modifying the features of specific session routes associated with a particular locatable entity. Examples of such route features include the speakers/microphones of a PDA, the video camera of a PDA, etc. Examples of possible modifications to these route features include the muting of the speakers/microphones of a PDA, the reactivation of the speakers/microphones of a PDA and the disabling of the video camera of a PDA, among other possibilities.

Note that, when the current route table 616 of a particular entity includes two or more different types of communications sessions, the new route table resulting from the rules-based processing of the processor 500 may include a different route reconfiguration for each different type of communications session. For example, assume that, prior to the rules-based processing, the current route table for John Smith included two types of communications sessions, notably (1) voice and (2) instant message, where the associated possible routes for voice communications sessions were (1A) PDA and (1B) voicemail, while the associate possible route for instant message communications sessions was (2A) PDA. The new route table output by the rules-based processing may reflect a single possible route for voice communications sessions, notably (1A) voicemail and no possible routes for instant message communications sessions. This differentiated route reconfiguration is determined by the predefined rules associated with the particular entity applied by the processor 500.

As discussed above, in an alternative, the processor 500 may proceed directly to modifying the session routing for a particular entity upon receipt by the SRU 102 of a location update or an activity status update for the respective entity, without first generating the resulting location-enhanced information. More specifically, on the basis of a received location update from the LU 104 or a received presence update from the PDU 106, the processor 500 may proceed directly to updating the current route table associated with the respective entity. If the processor 500 determines that redirection of the communications sessions associated with the particular entity is required on the sole basis of the received location or activity status update, the SRU 102 will reconfigure the route(s) associated with each type of communications session destined for the particular entity.

The processor 500 is characterized by event-driven functionality. In other words, the processor 500 is responsive to the occurrence of specific events to implement its rules-based processing operations. Each specific event constitutes the reception by the processor 500 of routing-related data for a particular locatable entity, such as a location update, an activity status update, a personal calendar update, etc. The events stem primarily from two sources, notably the LU 104 and the PDU 106. However, events may also stem from other external sources 112 of routing-related data, as well as from the remote applications 112.

Figure 8:
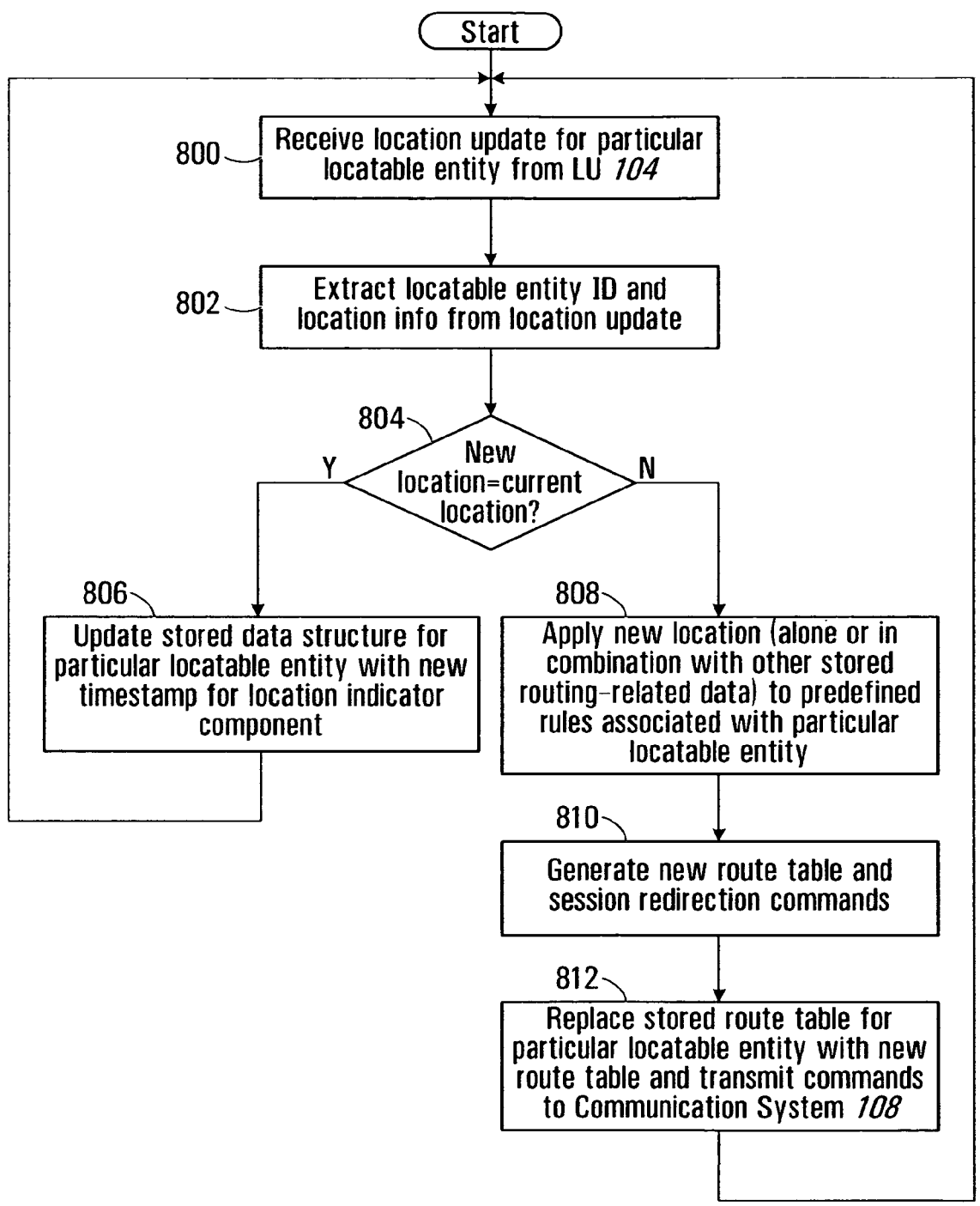
FIG. 8 is a flowchart depicting the event-driven operation performed by the processor of the session redirection unit, in accordance with a non-limiting example of implementation of the present invention.

FIG. 8 is a flowchart depicting the event-driven operation of the processor 500 of the SRU 102, in accordance with a non-limiting example of implementation of the present invention. In the example of FIG. 8, the event driving the operation of the processor 500 is the reception by the SRU 102 of a location update for a particular locatable entity from the LU 104. At step 800, the interface 502A receives the location update from the LU 104 over input 504A. At step 802, the interface 502A interprets the location update and extracts therefrom a locatable entity identifier and location information, which the interface 502A formats into a data structure suitable for rules processing by the processor 500. The interface 502A then forwards the locatable entity identifier and location information to the processor 500. At step 804, the processor 500 determines whether the new location of the locatable entity is different from the current location of the locatable entity, by comparing the received location information to the location indicator component 604 of the respective LE data structure 600. If there has been no change in location for the locatable entity, the processor 500 updates the respective LE data structure 600 to replace the timestamp associated with the location indicator component 604 and processing stops, at step 806. If a change in location has occurred, the processor 500 applies the new location information, alone or in combination with some or all of the other routing-related datum stored in the respective LE data structure 600, to the predefined rules associated with the particular locatable entity, at step 808. At step 810, the processor 500 outputs a processing result, which in this non-limiting example consists of a new session route table and a corresponding set of session redirection commands for the call session control function 110A of the communications system 108. At step 812, the processor 500 replaces the current route table 616 stored in the respective LE data structure 600 with the new route table, and transmits the generated session redirection commands to the communications system 108, via interface 502C. Note that, with reference to the above-described example of FIG. 4, the update function 402 of the communications system 108 is operative to accept the session redirection commands from the SRU 102 and, on this basis, to update the dynamic session routing table 400 of the call session control function 110A.

Although the example of FIG. 8 is directed specifically to the event of receiving at the SRU 102 a location update from the LU 104, it should be noted that a similar set of processing steps would be applied by the processor 500 upon receipt at the SRU 102 of a presence update from the PDU 106 or some other routing-related data update from a remote application 110 or an external source 112.

As seen in FIG. 5, the SRU 102 optionally includes a Location-Enhanced Presence Engine (LEPE) 512, specifically operative to generate location-enhanced presence information on the basis of the location and presence information received from, or made available by, the LU 104 and the PDU 106, respectively. The LEPE 512 may optionally also operate on historical location and presence information, as well as historical location-enhanced presence information, stored in the memory 506. The LEPE 512 thus performs a pre-processing operation, in order to reduce the burden on the processor 500 of the SRU 102. The location-enhanced presence information generated by the LEPE 512 is transmitted to the processor 500 with an associated locatable entity identifier, and may also be used to update the respective LE data structure 600 in the memory 506. The processor 500 may then apply this location-enhanced presence information to its rules processing in order to determine, for example, whether modification of the session routing is required for the particular entity. In a specific example, the LEPE 512 generates and provides to the processor 500 a new location-enhanced presence component 608 for a particular locatable entity. The LEPE 512 also updates the respective LE data structure 600 in the memory 506 with the new location-enhanced presence component 608 and an associated timestamp 612. Alternatively, the LEPE 512 has read-only access to the memory 506 and it is the processor 500 that is solely responsible for updating the LE data structures 600 in the memory 506 with the location-enhanced presence information received from the LEPE 512.

The LEPE 512 thus implements sub-functionality of the processor 500 and is dedicated solely to the generation of location-enhanced presence information. Accordingly, similar to the processor 500, the LEPE 512 contains and operates on the basis of a plurality of predefined rules that intelligently combine the location and presence information for a particular entity with predetermined policy defined by the administrative and user databases 508, 510. Processing of these rules by the LEPE 512 results in the generation of location-enhanced presence information for the particular entity. For example, assume that the LU 104 provides the LEPE 512 with updated location information for John Smith indicating that John is in room X. Furthermore, John Smith's personal calendar indicates that he is currently attending a meeting. On the basis of this location and calendar information, the location-enhanced presence information generated by the LEPE 512 could be that John Smith is "in a meeting in room X". In another example, assume that John Smith is a surgeon and the LU 104 provides the LEPE 512 with updated location information for John Smith indicating that John is in a particular operating room of a hospital. Furthermore, the administrative schedule for the hospital indicates that an operation is currently scheduled for that particular operating room. On the basis of this location and schedule information, the location-enhanced presence information inferred by the LEPE 512 could be that John Smith is "performing surgery."

Figure 9:
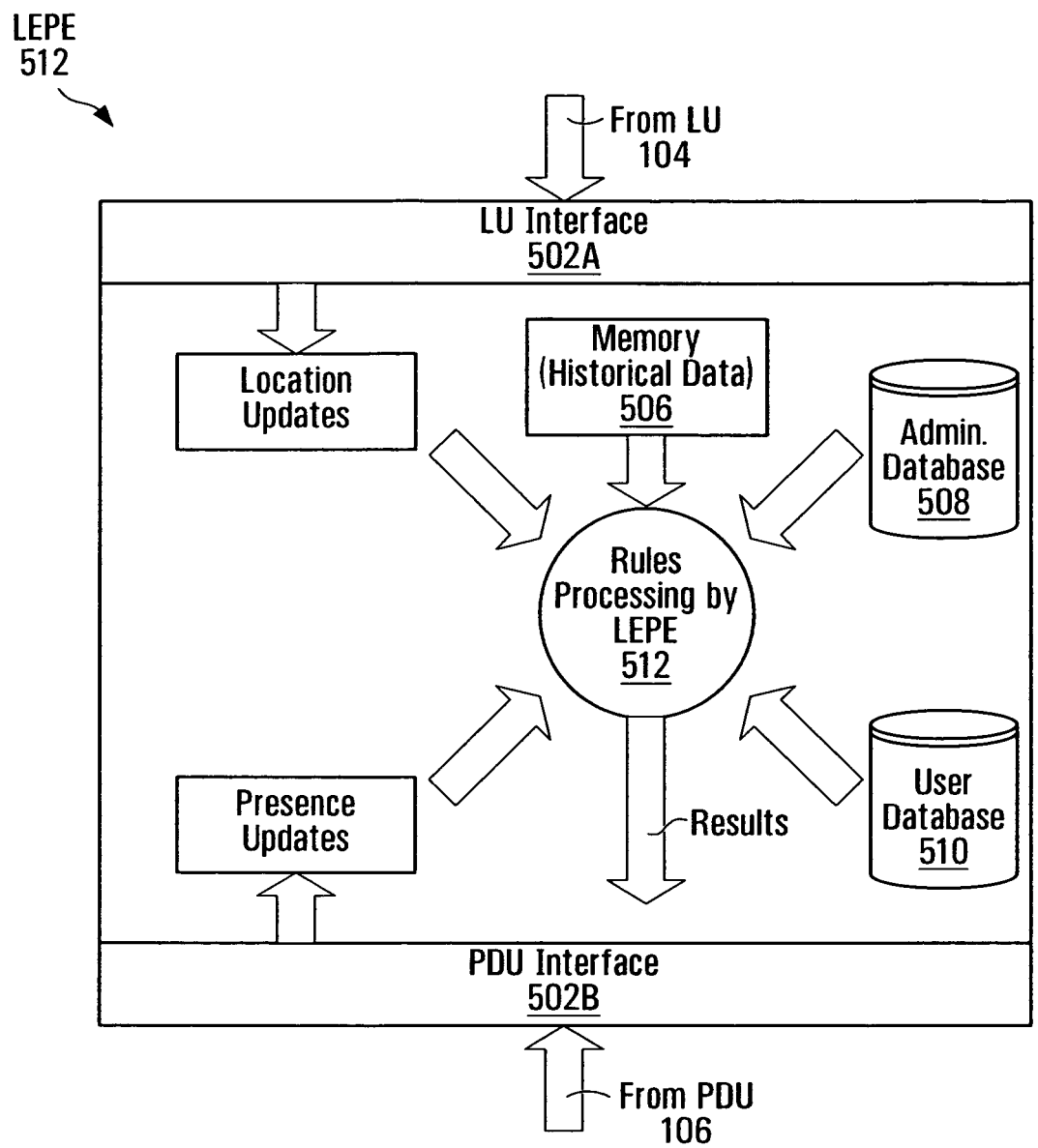
FIG. 9 is a block diagram illustrating the flow of data within a location-enhanced presence engine, in accordance with a non-limiting example of implementation of the present invention.

FIG. 9 illustrates the flow of data to and from the LEPE 512, according to a non-limiting example of implementation of the present invention. As in the case of the processor 500, the optional LEPE 512 is characterized by event-driven functionality. Therefore, the LEPE 512 is also responsive to the occurrence of specific events to implement its rules-based processing operations. Each specific event constitutes the reception by the LEPE 512 of either a location update or an activity status update for a particular locatable entity. These events stem from two sources, notably the LU 104 and the PDU 106, respectively.

Both the processor 500 and the LEPE 512 may optionally include one or more pre-processors to further simplify the processing burden, particularly useful if the processor 500 or LEPE 512 is not sophisticated enough or fast enough to accommodate significant amounts of data. In a specific example, such a pre-processor may be designed specifically to perform rules-based processing of historical data.

Note that, whether the location-enhanced presence information for a particular locatable entity is derived by the processor 500 or by the LEPE 512, this particular information may be made directly available to one or more of the remote applications 110 being serviced by the SRU 102, via the interface(s) 502C. Similarly, the processor 500 may make updated location information and/or updated presence information for a particular locatable entity directly available to the one or more remote applications 110 being serviced by the SRU 102, via the interfaces 502A and 502B. Updated location information, presence information and location-enhanced presence information may thus be available to the remote applications 110 as distinct intermediary information elements, during the course of the dynamic session redirect operations performed by the system 100. In a specific example, when the processor 500 or the LEPE 512 generates updated location-enhanced presence information for a particular locatable entity, this updated information is transmitted directly to the communications system 108 via the interface 502C, regardless of any ongoing processing by the processor 500 or the LEPE 512. At the communications system 108 end, this updated location-enhanced presence information may be used to update a presence indicator associated with the particular locatable entity, among other possible uses.

Figure 10:
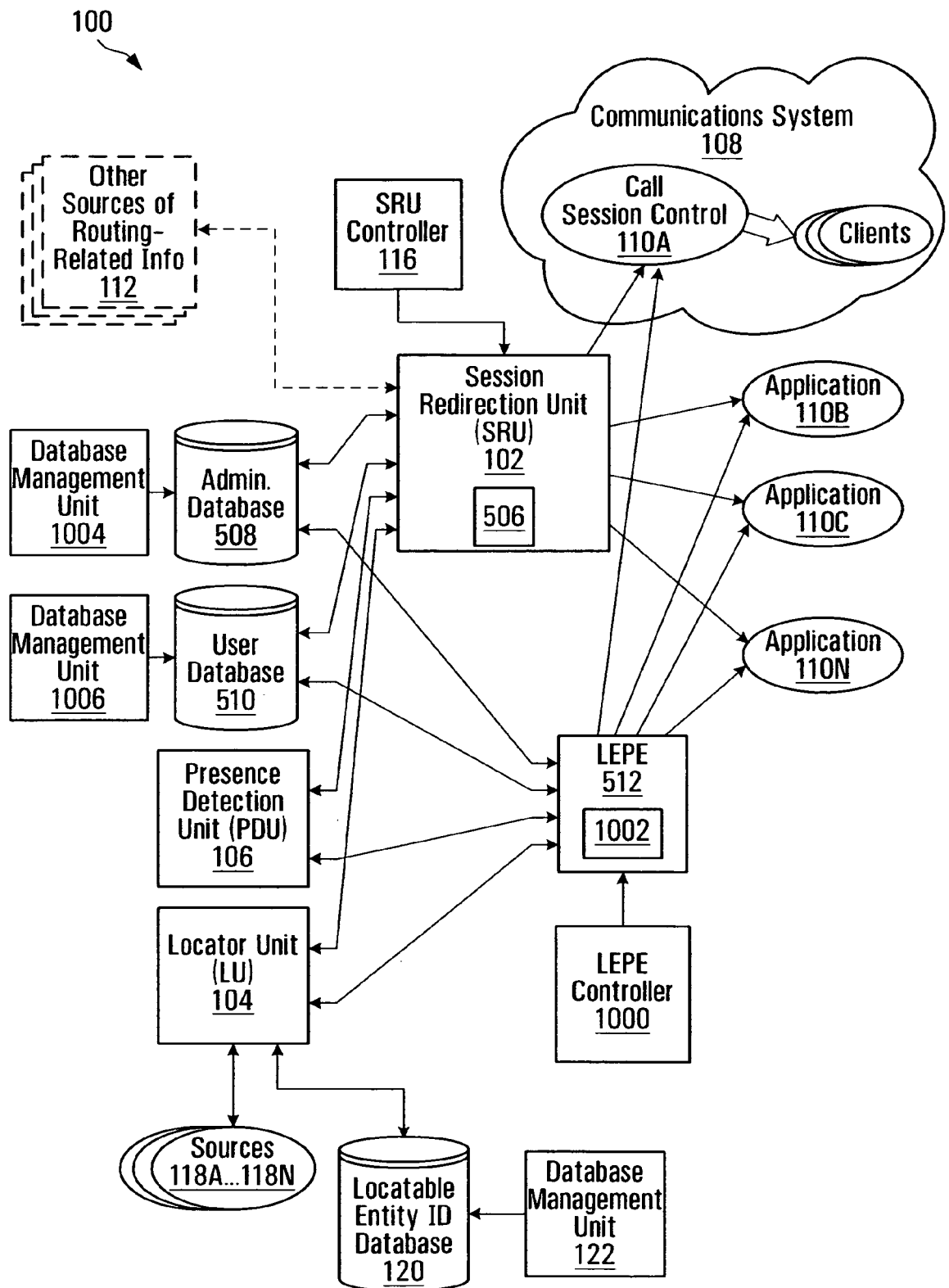
FIG. 10 is a block diagram of a system for dynamically redirecting communications sessions based on location-enhanced information, in accordance with a variant example of implementation of the present invention.

Although the LEPE 512 is shown in FIG. 5, and described above, as being a component of the SRU 102, the LEPE 512 may alternatively be implemented as a standalone functional unit, separate from the SRU 102. FIG. 10 is a block diagram depicting a variant of the system 100, in which the LEPE 512 is implemented separately from the SRU 102, according to a non-limiting example of implementation of the present invention. In the example of FIG. 10, the SRU 102 includes an additional interface (not shown) providing a portal for communications between the SRU 102 and the LEPE 512. Furthermore, the LEPE 512 includes a plurality of interfaces (not shown), each providing a portal for communications between the LEPE 512 and one of the SRU 102, the LU 104 and the PDU 106. An LEPE controller 1000 is provided to configure and control the LEPE 512, similar in functionality and implementation to the above-discussed SRU controller 116. Alternatively, as mentioned above, the SRU controller 116 may serve to configure and control both the SRU 102 and the LEPE 512.

As seen in FIG. 10, the administrative and user databases 508, 510 are implemented externally to the SRU 102 and are coupled to both the SRU 102 and the LEPE 512. In this case, each of the SRU 102 and the LEPE 512 may include one or more additional interfaces, dedicated to facilitating communications with the external administrative and user databases 508, 510. Alternatively, the administrative and user databases 508, 510 could be implemented within the SRU 102, in which case the LEPE 512 would access these databases via the respective interface of the SRU 102.

In FIG. 10, each of the administrative and user databases 508, 510 is coupled to a respective external database management unit 1004, 1006, operative to enable and facilitate the management and update of the content of each respective database. Alternatively, the database management units 1004 and 1006 may be implemented by the SRU 102. In yet another alternative, these databases 508, 510 could be coupled to the SRU controller 116, the latter responsible for the management and update of the database content, such that separate database management units 1004, 1006 are not needed.

In the example of FIG. 10, the LEPE 512 includes a memory 1002 for storing routing-related data associated with locatable entities, particularly historical location, presence and location-enhanced presence information. Alternatively, the LEPE 512 may be solely responsible for generating location-enhanced presence information, without providing for any storage of this information. In this case, the LEPE 512 would transmit all generated location-enhanced presence information to the SRU 102, for storage in the memory 506 of the SRU 102. When computing new location-enhanced presence information for a particular locatable entity, the LEPE 512 would access the historical presence, location and location-enhanced presence information for the particular locatable entity in the memory 506 of the SRU 102, via the respective interface of the SRU 102.

In another variant example of implementation of the present invention, the SRU 102 is responsive to commands received from at least one of the applications 110A . . . 110N to reconfigure the routing of communications sessions to one or more locatable entities and to ensure that the communications system 108 applies the resulting routing reconfiguration. Continuing with the above example in which one of the applications 110 is a rapid team formation application, the application may provide the SRU 102 with specific team formation criteria, based on which the SRU 102 performs its routing reconfiguration processing. For example, the application may direct the SRU 102 to reconfigure session routing for all those team members that are: 1) nearest to a particular event location; 2) not in an active voice session; and 3) not currently scheduled for a break. In this case, the SRU 102 would first obtain and process the necessary location, presence, administrative schedule and entity calendar information in order to identify the appropriate team members, after which the SRU 102 would reconfigure communications session routing to the selected team members accordingly. In one example where a key team member is currently engaged in a voice session, the SRU 102 may issue commands to the call session control 110A of the communications system 108 to interrupt and transfer the particular entity's voice session to an emergency conference bridge and to redirect all other voice session requests to that particular entity to voice mail. In another example, the SRU 102 may issue commands to the call session control 110 of the communications system 108 to enact sub-features of the devices associated with a particular entity, such as making an indicator on a device flash or illuminating/activating video/audio outputs on the device.

In another possible example of the foregoing variant example of implementation, the rapid team formation application may direct the SRU 102 to poll a group of interested parties near a particular location for interest in attending an immediate ad hoc event at the near-by particular location. The SRU 102 may use the location, presence and entity profile information to determine the particular entities that: 1) are near the location; 2) are not in a voice or video session; 3) have indicated "free time" in their presence status indicator; and 4) are of a particular gender or age. Upon identifying all of the locatable entities that meet the criteria set by the rapid team formation application, and in response to authorization from the application, the SRU 102 may reconfigure the session routing for all of the identified entities to a video multi-cast of the event-in-progress.

Those skilled in the art will appreciate that, in some embodiments, the functionality of the various components of the system 100 for dynamically redirecting communications sessions based on location-enhanced information may be implemented as pre-programmed hardware or firmware elements (e.g., application specific integrated circuits (ASICs), electrically erasable programmable read-only memories (EE-PROMs), etc.), or other related components. In other embodiments, a component of the system 100 may be implemented as an arithmetic and logic unit (ALU) having access to a code memory which stores program instructions for the operation of the ALU. The program instructions could be stored on a medium which is fixed, tangible and readable directly by the component (e.g., removable diskette, CD-ROM, ROM, or fixed disk), or the program instructions could be stored remotely but transmittable to the component via a modem or other interface device (e.g., a communications adapter) connected to a network over a transmission medium. The transmission medium may be either a tangible medium (e.g., optical or analog communications lines) or a medium implemented using wireless techniques (e.g., microwave, infrared or other transmission schemes).

The above-described system 100 for dynamically redirecting communications sessions based on location-enhanced information will now be discussed, and supporting examples provided, in the context of a specific working environment, notably a healthcare establishment. Although all of the above-described variants of the system 100 are applicable, for the sake of clarity assume hereinafter that the system 100 is implemented in accordance with FIGS. 1 and 5, and that the processor 500 performs all processing operations (i.e. no LEPE 512).

Assume that the communications system 108 is a multimedia communications network of a healthcare establishment (also referred to as a "hospital"). Accordingly, the communications system 108 includes a plurality of fixed terminals, such as stationary terminals or workstations, and a plurality of mobile terminals, such as handheld units (e.g., personal digital assistant (PDA)) or laptop computers, that are accessed by a plurality of "clinicians" that are mobile within the hospital. The term "clinician" is used to denote the broad category of individuals who may require access to the communications system 108. While not intended to be an exhaustive list, typically clinicians can include physicians, radiologists, pharmacists, interns, nurses, laboratory technicians and orderlies, who are all involved in patient diagnosis and/or treatment. In contrast, hospital administrative management, building facilities staff and janitorial staff are not considered to be "clinicians" under this interpretation.

In the example of the healthcare establishment, the locatable entities of the system 100 include the "clinicians", their proxy identifiers (such as hospital badges, personal cellular telephones, etc), the fixed and mobile terminals of the healthcare communications network, as well as hospital equipment (such as medical devices), among other possibilities. Accordingly, in this example, the LU 104 interacts with all those sources 118 of location information operating in connection with the healthcare establishment, which may include instances of RFID technology, WLAN technology and GPS technology, among other possibilities.

Furthermore, the administrative database 508 is populated with hospital policies for different groups of clinicians, individual clinicians or hospital equipment, while the user database 510 contains personal preferences defined by respective clinicians or groups of clinicians. In a specific example, a particular policy defined in the administrative database 508 may be that the use of cell phones is not permitted on the hospital grounds. In another specific example, a particular clinician's preference defined in the user database 510 may be that, when not performing surgery, all communications sessions be forwarded to the particular clinician's cell phone. Typically, the clinician-based policy of the user database 510 is overridden by the administrative policy of the administrative database 508.

In the case of clinicians subscribed to a healthcare communications network, the SRU 102 processes the location, presence and other routing-related information associated with the clinicians, on the basis of the respective predefined rules, in order to update each clinician's session routing table within the healthcare communications network. In a specific example, the SRU 102 reconfigures routing of communications sessions to Dr. Steve Martin on the basis of the following predefined rules:

When Dr. Martin is present in his office at the hospital, incoming voice sessions are to be routed to his desktop phone. If either his presence (i.e. activity status) within the healthcare communications network or his personal calendar indicates that he is "busy", the voice sessions are to be routed to voice mail or to his secretary.

When Dr. Martin is otherwise inside the building, all communications sessions are to be routed to his VoIP mobile handset. If his personal calendar also indicates that he is conducting a consultation, video sessions to his mobile handset are to be disabled. If his current location is determined to be close to a large-screen fixed terminal, video sessions are to be routed to the terminal and instant messaging is to be disabled.

When Dr. Martin is in any conference room, voice sessions are to be routed to his voicemail.

When Dr. Martin leaves the building, all communications sessions are to be routed to his business cellular phone. However, if Dr. Martin's work schedule indicates that he is off duty, all communications sessions are to be routed to another clinician or terminal.

FIGS. 11 to 14 illustrate examples of different scenarios affecting routing of communications sessions to a particular clinician within the hospital, where each scenario reflects one or more rules applied by the processor 500 of the SRU 102.

Figure 11:
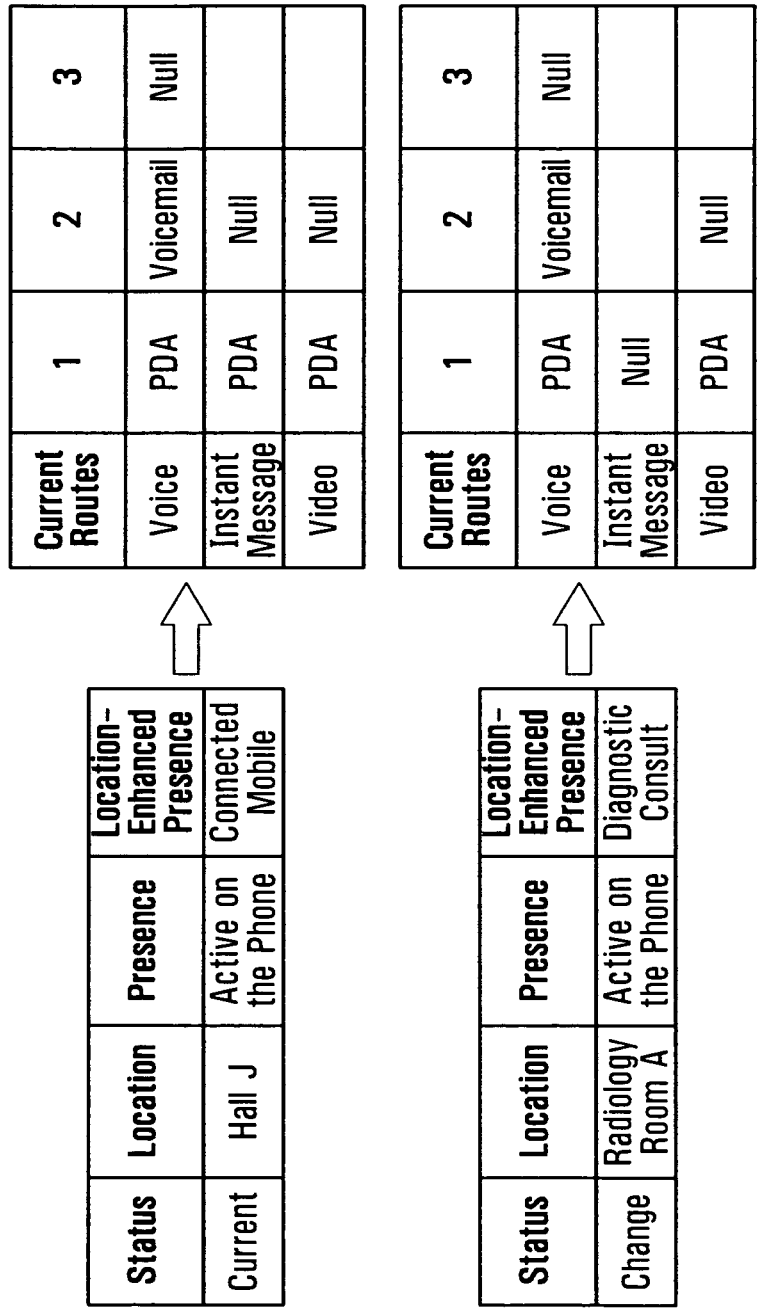
FIGS. 11 to 14 illustrate examples of different scenarios affecting routing of communications sessions to a particular clinician within a multimedia healthcare communications network, in accordance with a non-limiting example of implementation of the present invention.

In FIG. 11, the particular clinician changes locations within the hospital (i.e. from "Hall J" to "Radiology Room A"), which causes the SRU 102 to receive a location update from the LU 104 for the particular clinician. Rules-based processing of this location update in combination with stored presence information for the particular clinician leads to a change in the location-enhanced presence information for the particular clinician, as well as to a new route table for the particular clinician. The following rules are applied by the processor 500:

CASE Location(Radiology Room A) AND Presence(Active on the phone)→LocationEnhancedPresence(Diagnostic consult)

CASE LocationEnhancedPresence(Diagnostic consult)→DeleteRoute(IM)

Figure 12:
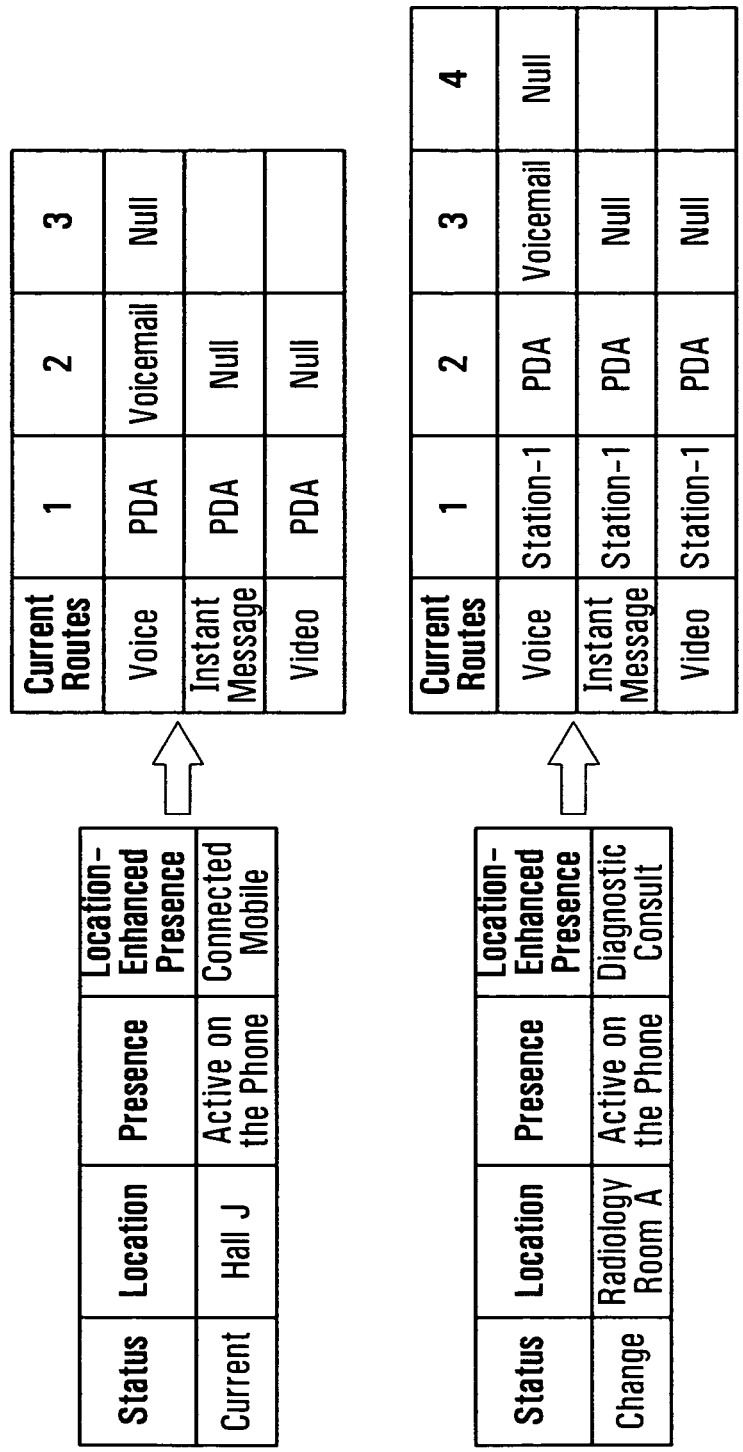

FIG. 12 illustrates a variant of the example of FIG. 11, in which rules-based processing of the location update alone leads to a new route table for the particular clinician. More specifically, a different rule is applied by the processor 500, notably:

CASE Location(Radiology Room A)→(CreateRoute(Station-1), Sessions(All), Priority(1))

Figure 13:
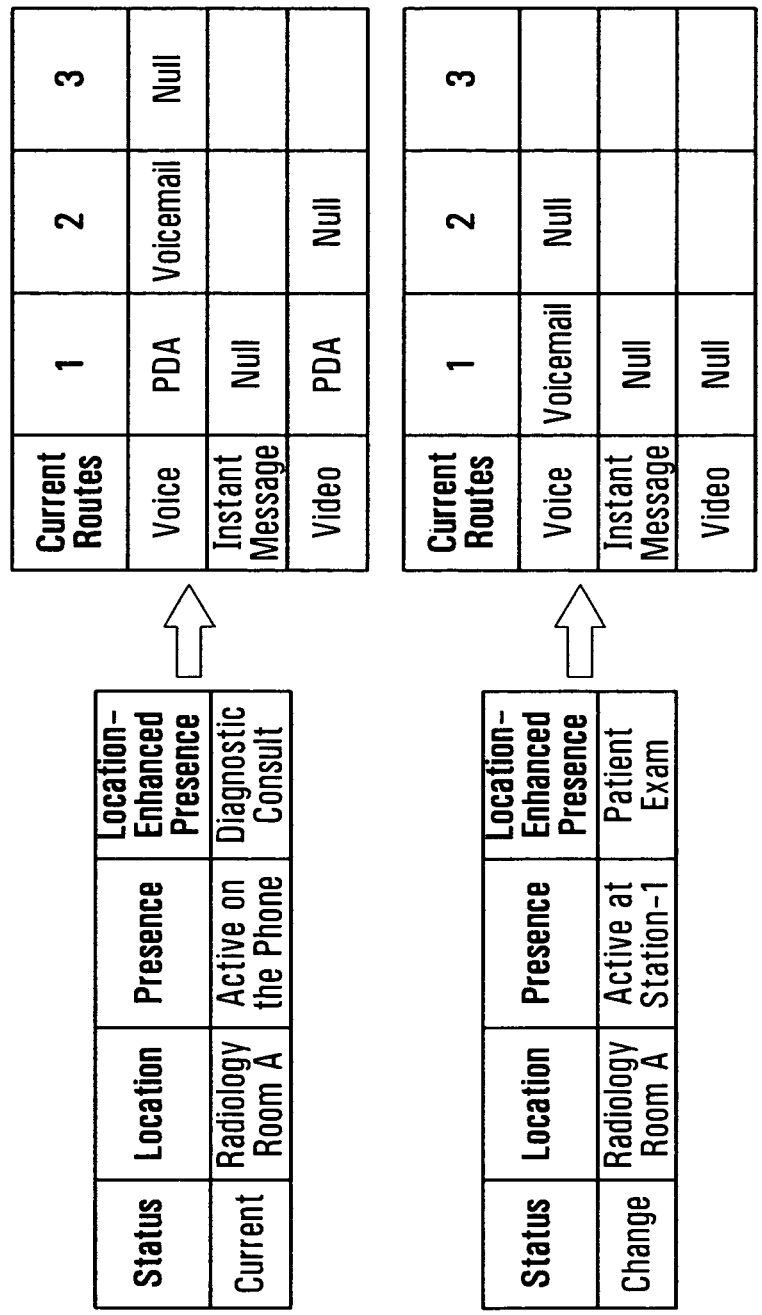

In FIG. 13, the clinician has a mobile terminal, such as PDA or a tablet, and there is a change in the presence (i.e. activity status) of the clinician within the healthcare communications network (i.e. from "Active on the phone" to "Active at Station-1"), which causes the SRU 102 to receive a presence update from the PDU 106 for the particular clinician. Rules-based processing of this presence update in combination with stored location information for the particular clinician leads to a change in the location-enhanced presence information for the particular clinician, as well as to a new route table for the particular clinician. The following rules are applied by the processor 500:

CASE Location(Radiology Room A) AND Presence(Active at Station-1)→LocationEnhancedPresence(Patient exam)

CASE LocationEnhancedPresence(Patient exam)→DeleteRoute(All); (AddRoute(Voicemail), Session(Voice))

Figure 14:
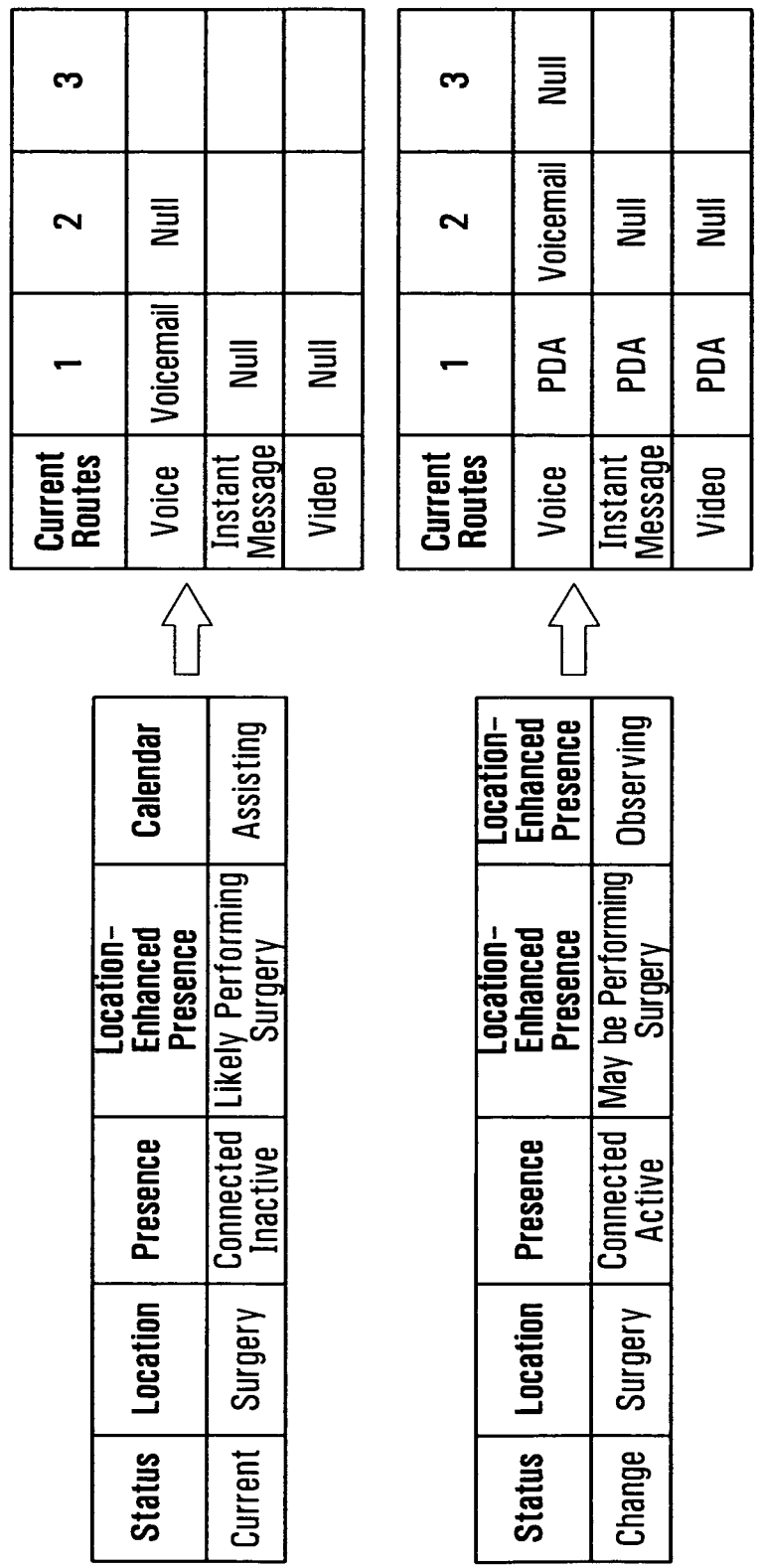
Figure 15:
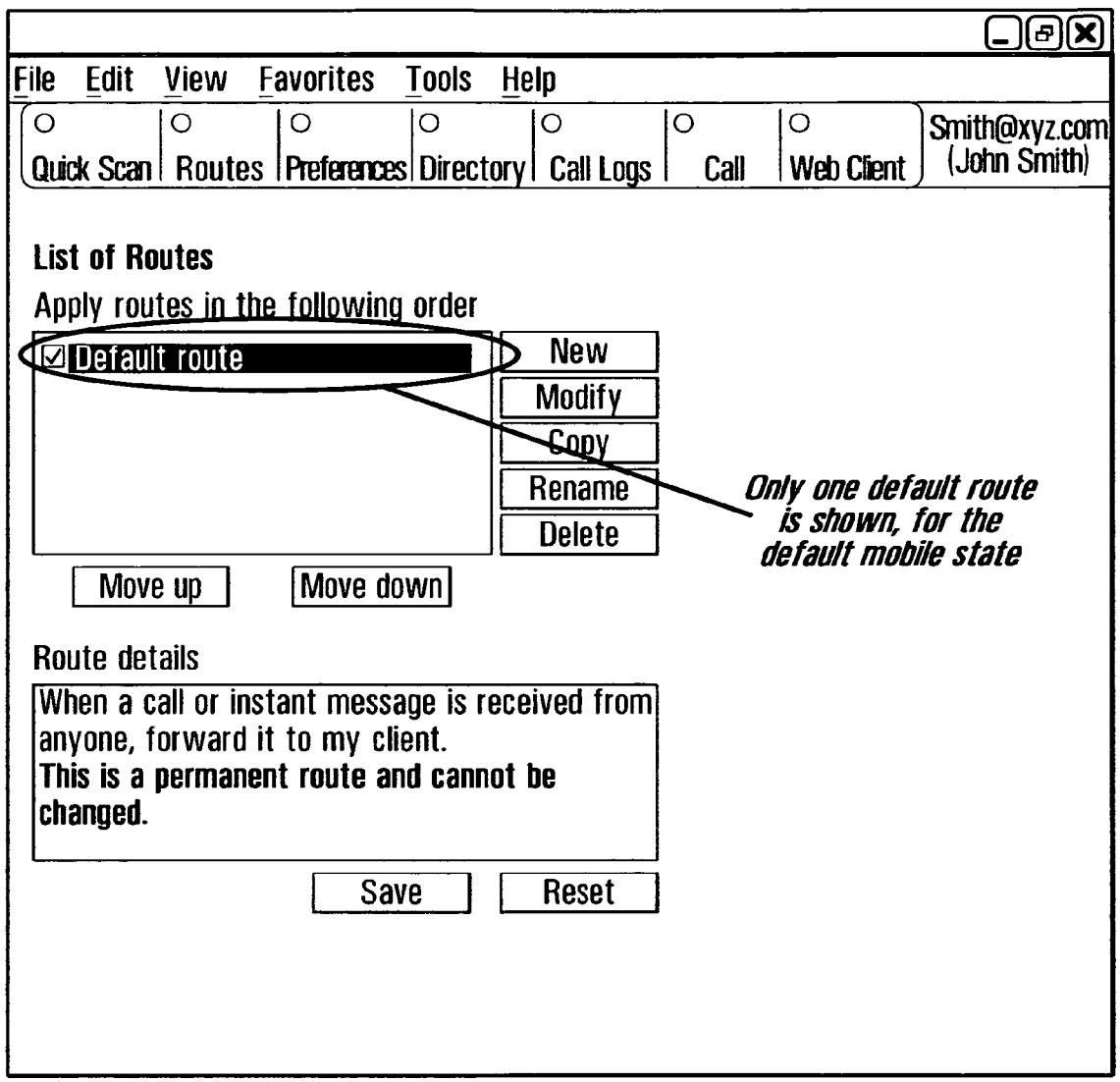
FIGS. 15 to 18 illustrate different scenarios in which the session routing table of a particular clinician of the hospital is modified within the multimedia healthcare communications network as a result of session redirection commands received from the session redirection unit, in accordance with a non-limiting example of implementation of the present invention.
Figure 16:
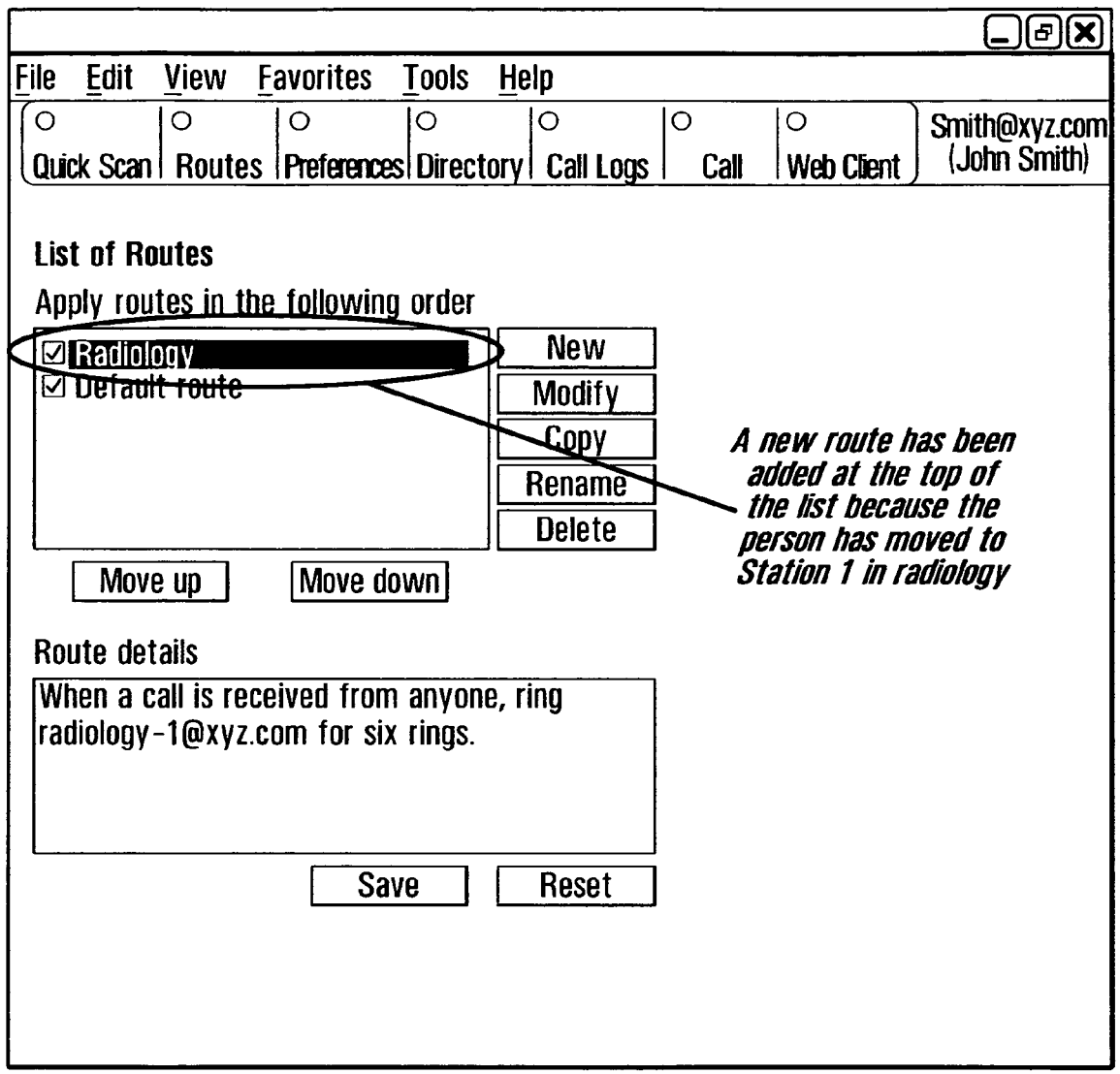
Figure 17:
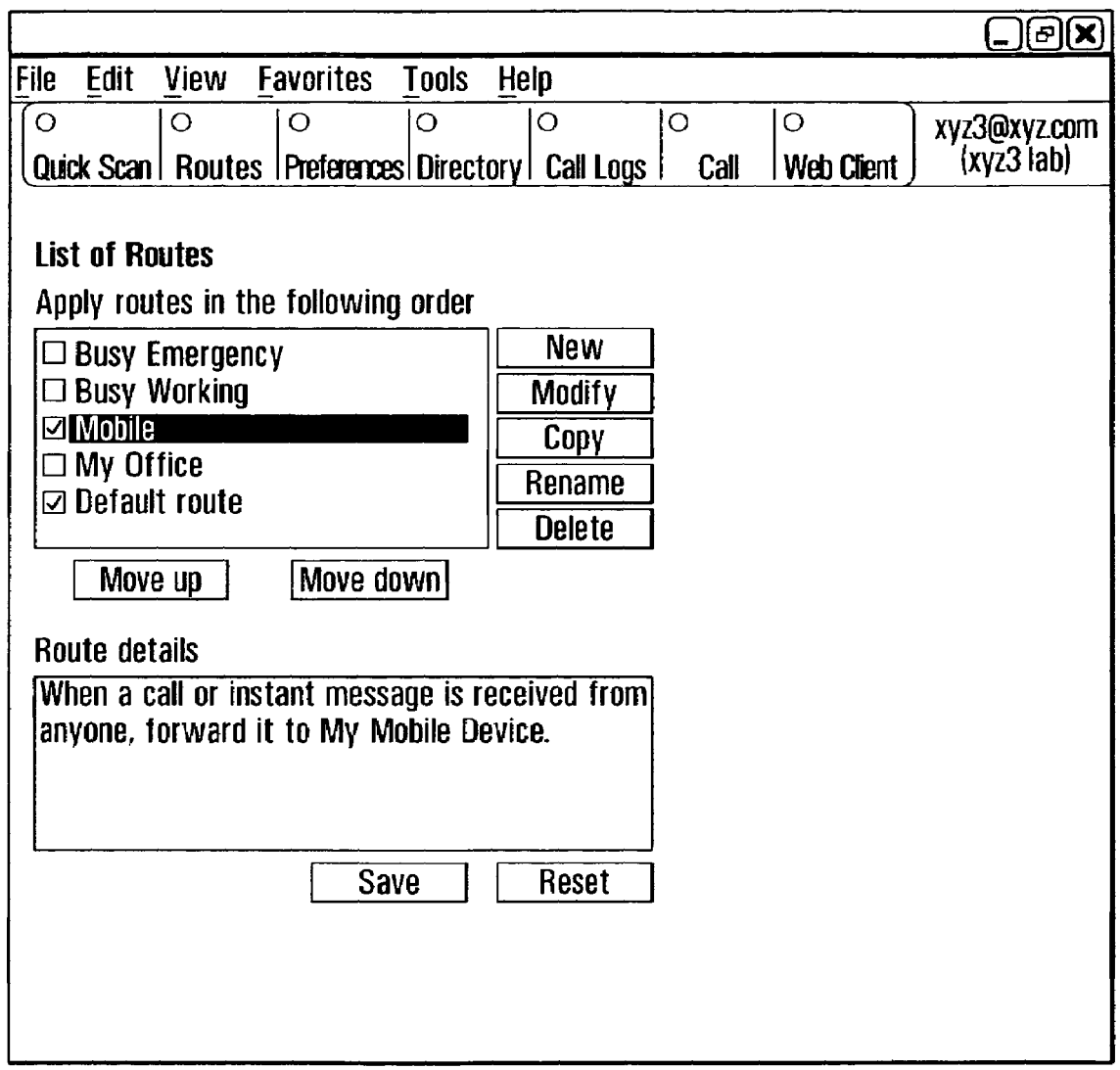
Figure 18:
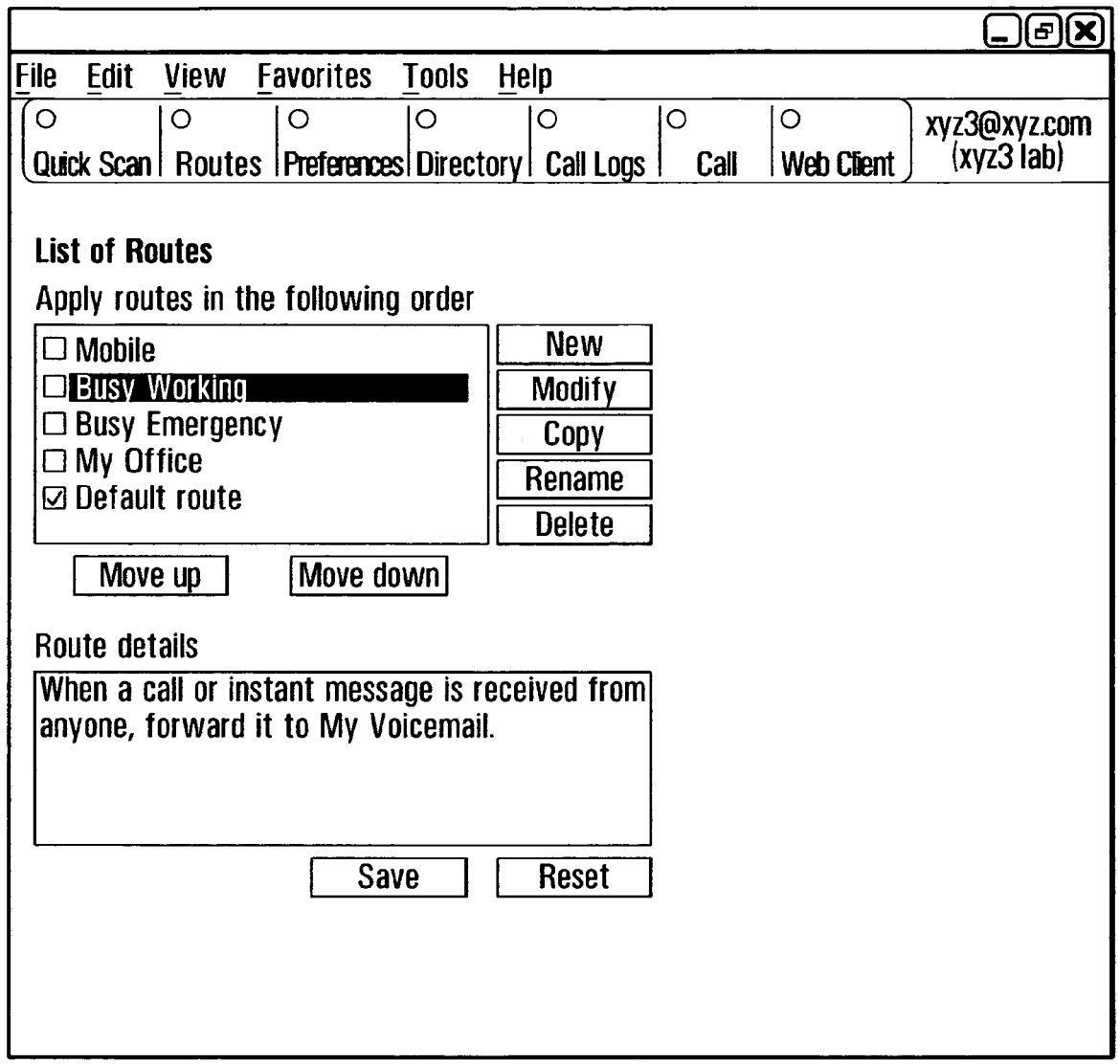

In FIG. 14, there is a change in the activity status of the clinician within the hospital (i.e. from "Connected inactive" to "Connected active"), as well as in the personal calendar entry of the clinician (i.e. from "Assisting" to "Observing"). Accordingly, the SRU 102 receives both a presence update for the particular clinician from the PDU 106 and a calendar update from a profile database 112 storing the personal calendar of the particular clinician. Rules-based processing of these presence and calendar updates in combination with stored location information for the particular clinician leads to a change in the location-enhanced presence information for the particular clinician, as well as to a new route table for the particular clinician. The following rules are applied by the processor 500:

CASE Location(Surgery) AND Presence(Connected active)→LocationEnhancedPresence(May be performing surgery)

CASE LocationEnhancedPresence(May be performing surgery) AND Calendar(Observing)→(AddRoute(PDA), Session(All), Priority(1))

As discussed above, the SRU 102 generates session redirection commands and transmits these commands to the healthcare communications network for updating the session routing table of the healthcare communications network. FIGS. 15 to 18 illustrate different scenarios in which the session routing table of a particular clinician may be modified by the call session control function of the healthcare communications network, as a result of received session redirection commands from the SRU 102. Note that, in the examples of FIGS. 15 to 18, the session routing table for the particular clinician is presented in the context of a Personal Agent interface displayed by a communications client of the healthcare communications network.

Figure 19:
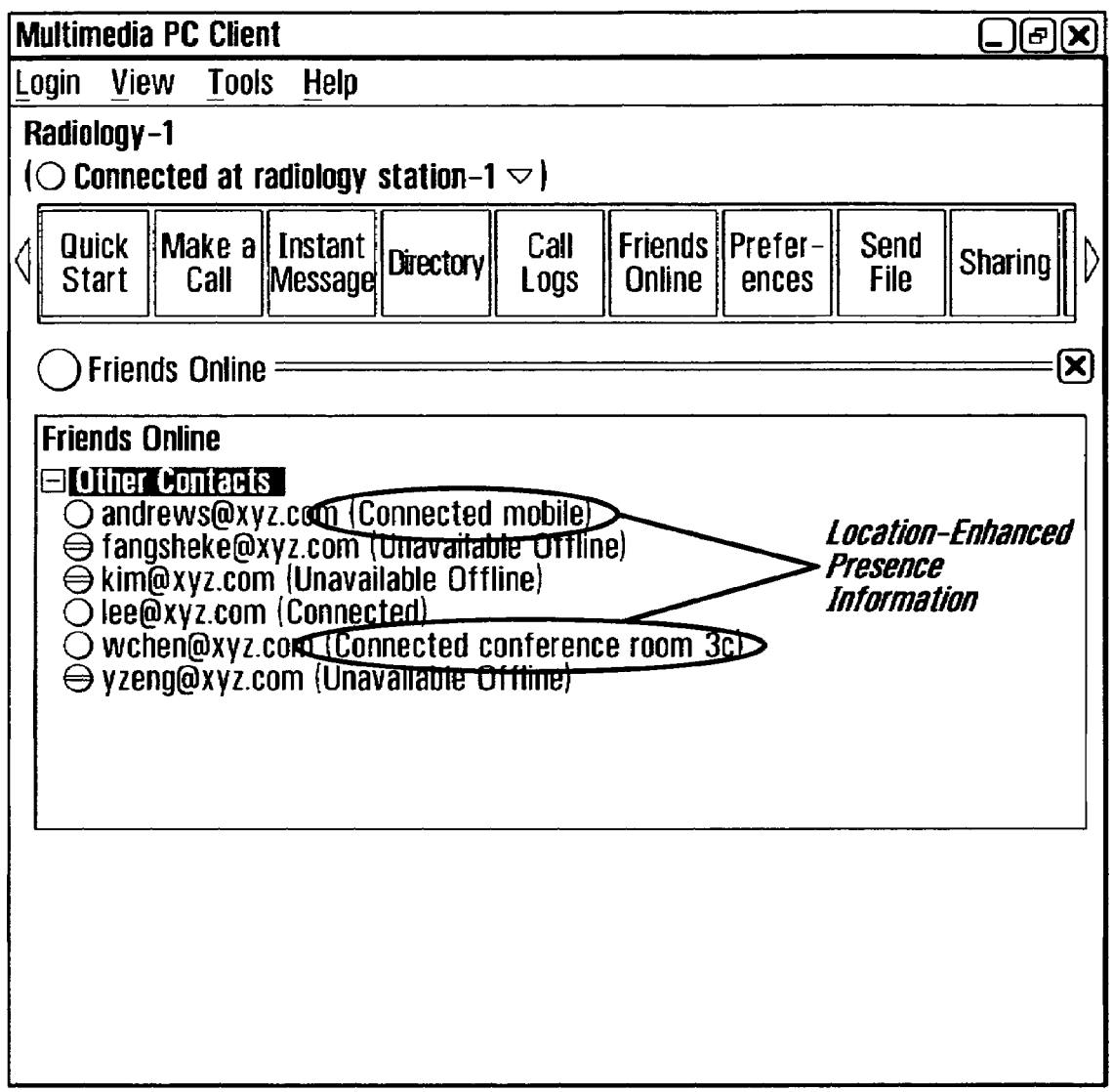
Figure 20:
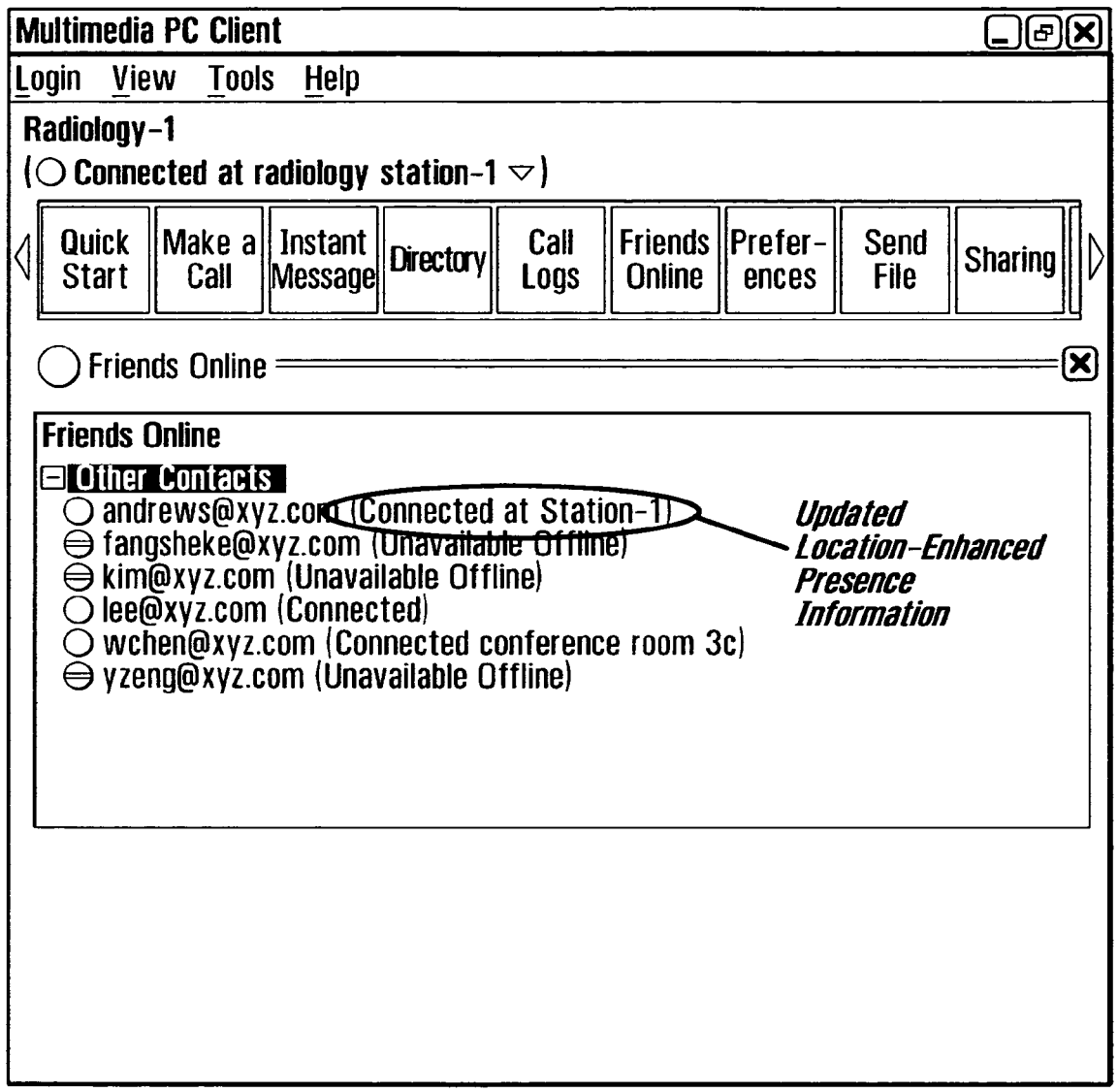

As also discussed above, the presence engine of the healthcare communications network is responsive to updated location-enhanced information received from the SRU 102 to update present indicators displayed within the healthcare communications network. FIGS. 19-21 illustrate different scenarios in which the presence indicators for different clinicians have been updated by the presence engine of the healthcare communications network, as a result of received location-enhanced information from the SRU 102, where the presence indicators appear in different possible interfaces displayed by the communications clients of the communications network.

Although various embodiments have been illustrated, this was for the purpose of describing, but not limiting, the invention. Various modifications will become apparent to those skilled in the art and are within the scope of the present invention, which is defined by the attached claims.

What is claimed is:

1. A method for determining location-enhanced presence information for a particular entity subscribed to a communications system, said method comprising:
   a) defining a set of conditional rules associated with the particular entity;
   b) obtaining a location update for the particular entity, said location update indicative of a current location of the particular entity;
   c) obtaining a presence update for the particular entity, said presence update indicative of a current activity status of the particular entity within the communications system;
   d) applying a combination of said current location and said current activity status of the particular entity as a condition to said conditional rules for determining current location-enhanced presence information for the particular entity, wherein the current location-enhanced presence information differs from both the location update and the presence update.

2. A method as defined in claim 1, further comprising:
   a) maintaining a history of location updates and presence updates for the particular entity;
   b) applying said history of location updates and presence updates to said conditional rules for determining said current location-enhanced presence information for the particular entity.

3. A method as defined in claim 1, further comprising:
   a) maintaining a history of location-enhanced presence information for the particular entity;
   b) applying said history of location-enhanced presence information to said conditional rules for determining said current location-enhanced presence information for the particular entity.

4. A method as defined in claim 1, further comprising obtaining at least one other type of information affecting routing of communications sessions to the particular entity and applying a combination of said current location, said current activity status and said at least one other type of information as a condition to said conditional rules for determining the current location-enhanced presence information for the particular entity.

5. A method as defined in claim 4, wherein said at least one other type of information affecting the routing of the communications sessions to the particular entity includes entity profile information and administrative information.

6. A method as defined in claim 5, wherein said entity profile information includes a calendar, location visibility attributes and trigger descriptions associated with the particular entity.

7. A method as defined in claim 5, wherein said administrative information includes a shift schedule, an equipment schedule and trigger descriptions.

8. A device for determining location-enhanced presence information for a particular entity subscribed to a communications system, said device comprising:
   a) a first input for receiving a location update for the particular entity, said location update indicative of a current location of the particular entity;
   b) a second input for receiving a presence update for the particular entity, said presence update indicative of a current activity status of the particular entity within the communications system;
   c) a processing unit including a set of conditional rules associated with the particular entity, said processing unit operative to apply a combination of said current location and said current activity status of the particular entity as a condition to said conditional rules for determining current location-enhanced presence information for the particular entity, wherein the current location-enhanced presence information differs from both the location update and the presence update.

9. A device as defined in claim 8, further comprising a memory for maintaining a history of location updates and presence updates for the particular entity, said processing unit operative to apply said history of location updates and presence updates to said conditional rules for determining said current location-enhanced presence information for the particular entity.

10. A device as defined in claim 9, wherein said memory maintains a history of location-enhanced presence information for the particular entity, said processing unit operative to apply said history of location-enhanced presence information to said conditional rules for determining said current location-enhanced presence information for the particular entity.

11. A device as defined in claim 8, wherein said device is operative to obtain at least one other type of information affecting routing of communications sessions to the particular entity, said processing unit applying a combination of said current location, said current activity status and said at least one other type of information as a condition to said conditional rules for determining the current location-enhanced presence information for the particular entity.

12. A device as defined in claim 11, wherein said at least one other type of information affecting the routing of the communications sessions to the particular entity includes entity profile information and administrative information.

13. A device as defined in claim 12, wherein said entity profile information includes a calendar, location visibility attributes and trigger descriptions associated with the particular entity.

14. A device as defined in claim 12, wherein said administrative information includes a shift schedule, an equipment schedule and trigger descriptions.

15. A device as defined in claim 8, wherein said device is a component of a network including the communications system.

16. A device as defined in claim 15, wherein said device is operative to make said current location-enhanced presence information electronically available to at least one application running on a computing apparatus of said network.

17. A device as defined in claim 16, wherein the communications system is a multimedia communications system, said at least one application including a call session control application of the multimedia communications system.

18. A device as defined in claim 17, wherein said device is implemented within the multimedia communications system.

19. A non-transitory computer-readable storage medium containing a program element for execution by a computing apparatus to determine location-enhanced presence information for a particular entity, the program element including:
   a) computer-readable program code for detecting receipt of a location update for the particular entity, said location update indicative of a current location of the particular entity;
   b) computer-readable program code for detecting receipt of a presence update for the particular entity, said presence update indicative of a current activity status of the particular entity;
   c) computer-readable program code for processing a combination of said current location and said current activity status of the particular entity on a basis of a set of predefined conditional rules associated with the particular entity, thereby determining the location-enhanced presence information for the particular entity, wherein the location-enhanced presence information differs from both the location update and the presence update.

20. A method of influencing communications session routing in a multimedia communications network, the multimedia communications network including a plurality of terminals, each terminal having a display, said method comprising:
   a) obtaining location-enhanced presence information associated with a first entity subscribed to the multimedia communications network, said location-enhanced presence information having been determined on a basis of a combination of a current location of the first entity and a current activity status within the multimedia communications network of the first entity in conjunction with the application of a set of conditional rules, wherein the location-enhanced presence information differs from both the current location and the current activity status;
   b) conveying said location-enhanced presence information for the first entity to a second entity subscribed to the multimedia communications network via a display of one of the plurality of terminals.

21. A method as defined in claim 20, further comprising:
   a) obtaining location information indicative of said current location of the first entity;
   b) obtaining presence information indicative of said current activity status of the first entity;
   c) generating said location-enhanced presence information on a basis of said current location and said current activity status of the first entity.

22. A non-transitory computer-readable storage medium containing a program element for execution by a computing apparatus to influence communications session routing in a multimedia communications network, the multimedia communications network including a plurality of terminals, each terminal having a display, said program element including:
   a) computer-readable program code for detecting receipt of location-enhanced presence information for a first entity subscribed to the multimedia communications network, said location-enhanced presence information having been determined on a basis of a combination of a current location of the first entity and a current activity status within the multimedia communications network of the first entity in conjunction with the application of a set of conditional rules, wherein the location-enhanced presence information differs from both the current location and the current activity status;
   b) computer-readable program code for conveying said location-enhanced presence information for the first entity to a second entity subscribed to the multimedia communications network via a display of one of the plurality of terminals.

* * * * *